United States Patent
Fussman et al.

(10) Patent No.: US 11,987,002 B2
(45) Date of Patent: May 21, 2024

(54) WASHING APPARATUS AND METHODS USED TO PROCESS ADDITIVELY FABRICATED PARTS

(71) Applicant: Formlabs, Inc., Somerville, MA (US)

(72) Inventors: Jonathan Fussman, Brookline, MA (US); Hugo Liebrand, Eindhoven (NL); David Sadowski, San Diego, CA (US); Alexander K. McCalmont, Hollis, NH (US); Craig Broady, Somerville, MA (US); Nicholaus Ray Lancaster, Hull, MA (US); Maxim Lobovsky, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/826,787

(22) Filed: May 27, 2022

(65) Prior Publication Data
US 2022/0379562 A1 Dec. 1, 2022

Related U.S. Application Data

(60) Provisional application No. 63/194,856, filed on May 28, 2021.

(51) Int. Cl.
| | |
|---|---|
| *B29C 64/35* | (2017.01) |
| *B08B 3/08* | (2006.01) |
| *B08B 3/14* | (2006.01) |
| *B08B 13/00* | (2006.01) |
| *B33Y 40/20* | (2020.01) |

(52) U.S. Cl.
CPC ............... *B29C 64/35* (2017.08); *B08B 3/08* (2013.01); *B08B 3/14* (2013.01); *B08B 13/00* (2013.01); *B33Y 40/20* (2020.01)

(58) Field of Classification Search
None
See application file for complete search history.

(56) References Cited

U.S. PATENT DOCUMENTS

| 4,932,837 A | * | 6/1990 | Rymal | ..................... F04D 7/04 |
|---|---|---|---|---|
| | | | | 415/206 |
| 5,117,645 A | * | 6/1992 | Bryant | .................. F25B 41/315 |
| | | | | 62/174 |
| 5,135,027 A | * | 8/1992 | Miki | ................... F16K 31/0637 |
| | | | | 137/596.17 |

(Continued)

*Primary Examiner* — Eric W Golightly
(74) *Attorney, Agent, or Firm* — Wolf, Greenfield & Sacks, P.C.

(57) ABSTRACT

Washing apparatus and methods used to process additively fabricated (e.g., 3D printed) parts are described herein. The apparatus and methods may be used to wash uncured liquid resin from the parts. The washing apparatus may include two or more containers for storing respective solvents and may be fluidly connected to a vessel in which the additively fabricated parts are placed. One or more pumps and one or more valves may be controlled to introduce a first solvent from one of the containers into the vessel to wash the part in a first wash cycle and then the valve(s) may be reconfigured to introduce a second solvent from another container into the vessel to wash the part in a second wash cycle. Advantageously, the parts may remain in the same vessel while being washed with both solvents in succession.

18 Claims, 16 Drawing Sheets

(56) References Cited

U.S. PATENT DOCUMENTS

| | | | | |
|---|---|---|---|---|
| 5,213,117 A | * | 5/1993 | Yamamoto | B08B 3/08 |
| | | | | 134/58 DL |
| 5,772,394 A | * | 6/1998 | Yokota | F04D 9/02 |
| | | | | 415/56.1 |
| 2007/0133143 A1 | * | 6/2007 | Laurent | F16H 61/0006 |
| | | | | 361/160 |
| 2016/0108522 A1 | * | 4/2016 | Donovan | B33Y 40/20 |
| | | | | 118/712 |
| 2019/0186486 A1 | * | 6/2019 | Howseman, Jr. | F04B 13/00 |

* cited by examiner

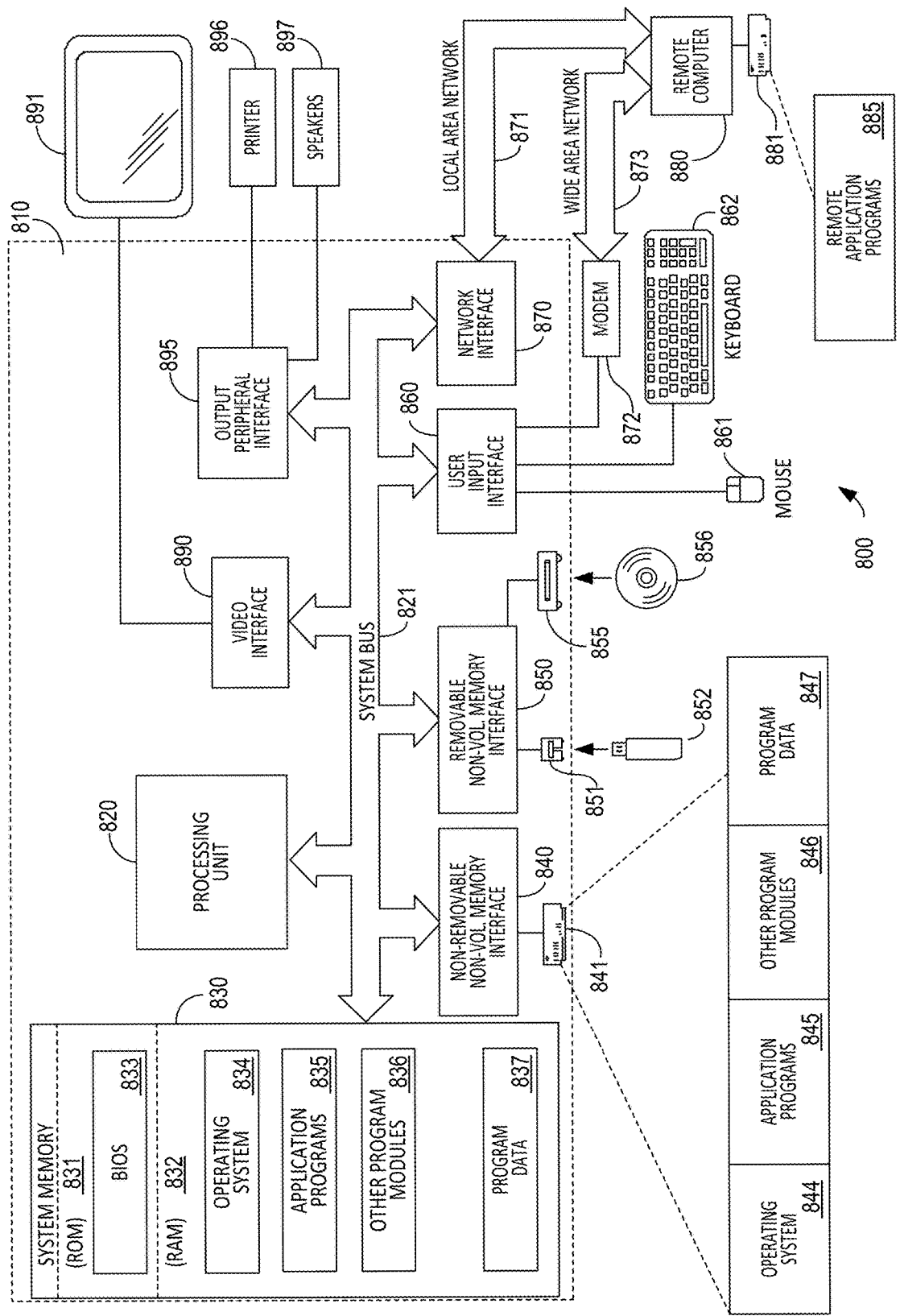
FIG. 8 –Prior Art–

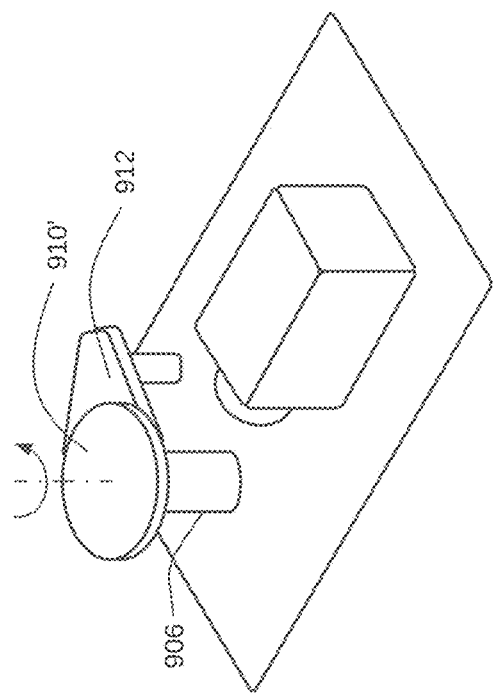
FIG. 9B
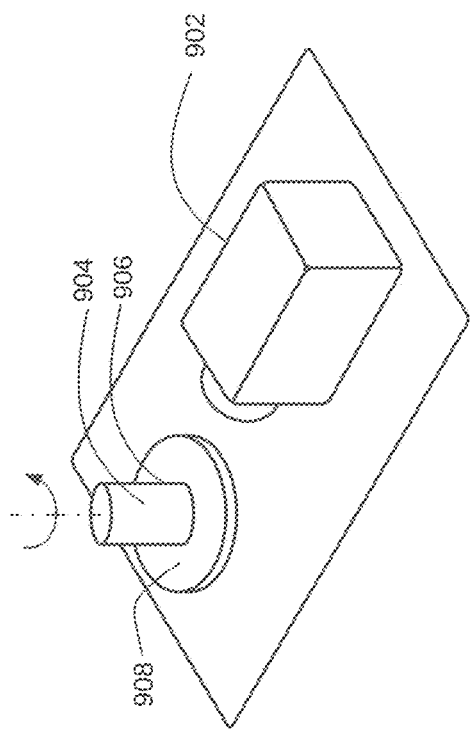
FIG. 9A
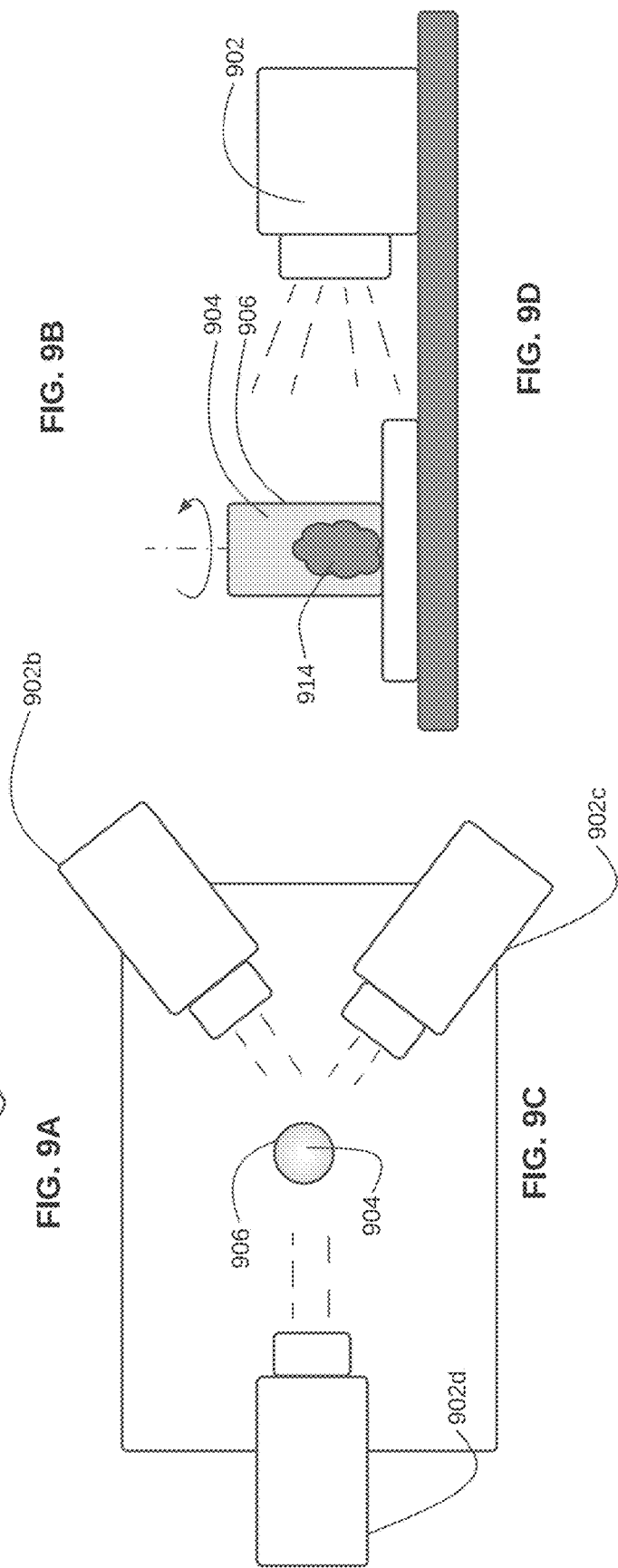
FIG. 9D
FIG. 9C

WASHING APPARATUS AND METHODS USED TO PROCESS ADDITIVELY FABRICATED PARTS

CROSS REFERENCE TO RELATED APPLICATIONS

The present application claims the benefit under 35 U.S.C. § 119(e) of U.S. Provisional Patent Application No. 63/194,856, filed May 28, 2021, titled "Washing Apparatus and Methods Used to Process Additively Fabricated Parts," which is hereby incorporated by reference in its entirety.

FIELD

This application relates generally to additive fabrication (e.g., 3-dimensional (3D) printing) and, more specifically, to washing apparatus and methods used to process additively fabricated (e.g., 3D printed) parts.

BACKGROUND

Additive fabrication, e.g., 3D printing, provides techniques for fabricating parts, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired part. Typically, each layer is formed such that it adheres to either a previously formed layer or a substrate upon which the part is built.

In one approach to additive fabrication, known as stereolithography, solid parts are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the part is formed by moving an area of incident actinic radiation (e.g., from a light source such as a laser) across the layer of liquid resin to complete the cross section of the part being formed. The process is repeated to form additional layers until the desired part is produced.

Some amount of uncured liquid resin typically remains on part surfaces after printing in a stereolithography process. It may be desirable to remove such resin in a washing step to enhance part quality and surface finish. Conventional washing steps typically involve exposing the part to a solvent (e.g., isopropyl alcohol (IPA)) to remove the uncured resin.

SUMMARY

Washing apparatus and methods used to process additively fabricated (e.g., 3D printed) parts are described herein.

In one aspect, an apparatus for processing additively fabricated parts is provided. The apparatus comprises an open-topped vessel comprising a drain located on an interior bottom surface of the vessel and having one or more inlets. The apparatus further comprises a first storage container and a second storage container. A first valve is coupled to the first storage container and the second storage container and is configured to switch between the first storage container and the second storage container. The apparatus further comprises a pump coupled to the first storage container and the second storage container, wherein the pump is coupled to the first valve and wherein the pump is located outside of the vessel and the pump is coupled to the one or more inlets of the vessel. The apparatus further comprises a second valve coupled to the drain of the vessel, the first storage container and the second storage container, and is configured to switch between the first storage container and the second storage container.

In some embodiments, the apparatus further comprises a controller configured to operate the first valve and/or the second valve to switch between the first storage container and the second storage container.

In some embodiments, the apparatus further comprises a controller configured to operate the pump to move solvent from the first storage container or second storage container to the vessel.

In some embodiments, the pump is a self-priming pump or a positive-displacement pump or a centrifugal pump.

In some embodiments, the apparatus further comprises a filter coupled to and arranged between the drain of the vessel and the second valve.

In some embodiments, the apparatus further comprises a first secondary pump located inside of the first storage container and a second secondary pump located inside of the second storage container. The first secondary pump and the second secondary pump are each coupled to an inlet of the pump.

In some embodiments, the apparatus further comprises a first check valve coupled to the first secondary pump and a second check valve coupled to the second secondary pump. The first check valve is located inside of the first storage container and the second check valve is located inside of the second storage container.

In some embodiments, at least one of the one or more inlets is arranged within the interior bottom surface of the vessel.

In some embodiments, the interior bottom surface of the vessel slopes away from the sides toward the bottom surface of the vessel.

In some embodiments, the apparatus further comprises a fan arranged above the vessel, oriented to direct air into the vessel.

In some embodiments, the apparatus further comprises a first level sensor located in the first storage container configured to sense a level of solvent in the first storage container.

In some embodiments, the apparatus further comprises a first saturation sensor located in the first storage container configured to sense whether a solvent in the first storage container is saturated with a target solute.

In some embodiments, the apparatus further comprises a second pump coupled to the first storage container and the second storage container. The second pump may be coupled to second valve, may be located outside of the vessel and may be coupled to the drain of the vessel.

In one aspect, a method of processing additively fabricated parts using an apparatus is provided. The apparatus comprises an open-topped vessel comprising a drain and one or more inlets, a first storage container, a second storage container, a first valve coupled to the first storage container and the second storage container. The apparatus comprises a pump coupled to the first valve, the first storage container, the second storage container and the one or more inlets. The apparatus comprises a second valve coupled to the drain of the vessel, the first storage container and the second storage container. The method comprises placing an additively fabricated part in the vessel and operating the pump using at least one controller to direct a first solvent from the first storage container into the vessel through the one or more inlets while the first valve is in a configuration open to the first storage container and closed to the second storage container. The method further comprises draining the first solvent from the vessel through the drain and the second valve into the first storage container. The method further comprises actuating the first valve to a configuration using the at least one controller so that the first valve is closed to the first storage container and open to the second storage container. The method further comprises operating the pump using the at least one controller to direct a second solvent from the second storage container into the vessel through the one or more inlets while the first valve is closed to the first storage container and open to the second storage container. The method further comprises draining the second solvent from the vessel through the drain and the second valve into the second storage container.

In some embodiments, the method further comprises, subsequent to draining the first solvent from the vessel through the drain and the second valve into the first storage container, actuating the second valve to a configuration to be closed to the first storage container and open to the second storage container. The second valve may be in a configuration open to the first storage container and closed to the second storage container while operating the pump to direct the first solvent from the first storage container into the vessel. The second valve may be in a configuration closed to the first storage container and open to the second storage container while operating the pump to direct the second solvent from the second storage container into the vessel.

In some embodiments, the method further comprises generating an alert indicating a completed cycle.

In some embodiments, the method further comprises operating a secondary pump located inside of the first storage container and coupled to an inlet of the pump to prime the pump with the first solvent.

In one aspect, a method is provided. The method comprises filling a container with photopolymer. The container is removably attached to a rotating device that is configured to rotate the container around a first axis, and one or more outlets. The method further comprises forming a three-dimensional object in the photopolymer within the container using a tomographic lithography process. The process includes controlling an optics engine to project a sequence of optical patterns of a first wavelength onto the container while rotating the container on the rotating device, thereby causing the sequence of optical patterns to irradiate the photopolymer from different angles and curing a portion of the volume of photopolymer to form a three-dimensional object. The process further includes, in response to forming the three-dimensional object in the volume of photopolymer, opening the one or more outlets to drain uncured photopolymer in the container while the three-dimensional object remains inside the container and the container remains attached to the rotating device.

In one aspect, a method is provided. The method comprises filling a container with photopolymer, wherein the container is removably attached to a rotating device that is configured to rotate the container around a first axis, and the container includes one or more inlets and one or more outlets. The method further comprises forming a three-dimensional object in the photopolymer within the container using a tomographic lithography process. The process includes controlling an optics engine to project a sequence of optical patterns of a first wavelength onto the container while rotating the container on the rotating device, thereby causing the sequence of optical patterns to irradiate the volume of photopolymer from different angles and curing a portion of the volume of photopolymer to form a three-dimensional object. The process further includes, in response to forming the three-dimensional object in the volume of photopolymer, removing the three-dimensional object from the container and placing the three-dimensional object in a post-processing device.

In one aspect, a method is provided. The method comprises directing a liquid photopolymer into a container, wherein the container is removably attached to a rotating device that is configured to rotate the container around a first axis, and the container includes one or more inlets and one or more outlets, forming a three-dimensional object within the photopolymer within the container through a tomographic lithography process, the tomographic lithography process including controlling an optics engine to project a sequence of optical patterns of a first wavelength onto the container while rotating the container on the rotating device, thereby causing the sequence of optical patterns to irradiate the photopolymer from different angles and curing a portion of the volume of photopolymer to form the three-dimensional object, and in response to forming the three-dimensional object in the volume of photopolymer, opening the one or more outlets to drain uncured photopolymer from the container while the three-dimensional object remains inside the container and the container remains attached to the rotating device.

In one aspect, a method is provided. The method comprises directing a liquid photopolymer into a container, wherein the container is removably attached to a rotating device that is configured to rotate the container around a first axis, and the container includes one or more inlets and one or more outlets, forming a three-dimensional object in the photopolymer within the container through a tomographic lithography process, the tomographic lithography process including controlling an optics engine to project a sequence of optical patterns of a first wavelength onto the container while rotating the container on the rotating device, thereby causing the sequence of optical patterns to irradiate the volume of photopolymer from different angles and curing a portion of the volume of photopolymer to form a three-dimensional object, and in response to forming the three-dimensional object in the volume of photopolymer, removing the three-dimensional object from the container and placing the three-dimensional object in a post-processing device.

In some embodiments, the method includes, in response to opening the one or more outlets to drain the uncured photopolymer, filling the container with a wash solvent through the one or more inlets.

In some embodiments, the container includes an impeller and the method further includes, in response to filling the container with the wash solvent, agitating the wash solvent to wash the three-dimensional object by activating the impeller to stir the wash solvent or jet the wash solvent directed towards the three-dimensional object.

In some embodiments, the container includes an ultrasonic cleaning device and the method further includes, in response to filling the container with the wash solvent, agitating the wash solvent to wash the three-dimensional object by activating the ultrasonic device.

In some embodiments, the method includes, in response to draining the uncured photopolymer, rotating the container to cause further cleaning of the three-dimensional object by centrifugal force.

In some embodiments, the method includes, in response to draining the uncured photopolymer, directing air flow into the container.

In some embodiments, an inner surface of the container is coated with polymer-phobic material.

In some embodiments, the method includes, in response to draining the uncured photopolymer, activating a curing device to cure the three-dimensional object inside the container.

In some embodiments, the curing device is the optics engine, and the method includes activating the curing device includes controlling the optics engine to expose the container to light of a second wavelength.

In some embodiments, the curing device is a heating device that is configured to heat the container.

Other aspects, features and embodiments will become apparent from the following detailed description of various non-limiting embodiments when considered in conjunction with the accompanying figures. In cases where the present specification and a document incorporated by reference include conflicting and/or inconsistent disclosure, the present specification shall control.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 8 illustrates an example of a computing system environment on which aspects of the invention may be implemented;

FIGS. 9A-9D illustrate various exemplary configurations of a tomographic lithographic printing device according to some embodiments;

DETAILED DESCRIPTION

A washing apparatus and related methods are described herein. The apparatus and methods may be used to wash an additively fabricated part. For example, the part may be produced in a stereolithographic 3D printing process that involves curing liquid resin in a layer-by-layer fashion. The washing apparatus and methods may be used to remove uncured liquid resin from part surfaces which is residual from the printing process.

In general, the washing apparatus include two or more containers for storing respective solvents (e.g., isopropyl alcohol (IPA), tripropylene glycol monomethyl ether (TPM), water, etc.). The containers are fluidly connected to a vessel in which the additively fabricated part is placed. As described further below, one or more pumps and one or more valves may be controlled to introduce a first solvent from one of the containers into the vessel to wash the part in a first wash cycle and then the valve(s) may be re-configured to introduce a second solvent from another container into the vessel to wash the part in a second wash cycle. Advantageously, the part may remain in the same vessel while being washed with both solvents in succession. In some methods, the pump(s) may be operated in a manner that sprays the part which can enhance cleaning. Some methods may involve continuously circulating the solvent(s) through the vessel by draining the solvent from the vessel (e.g., from the bottom of the vessel) and re-introducing (e.g., at the top of the vessel) solvent from the appropriate container. Such circulation can enhance the effectiveness of the apparatus in removing uncured liquid resin from the part surfaces.

Figure 1:
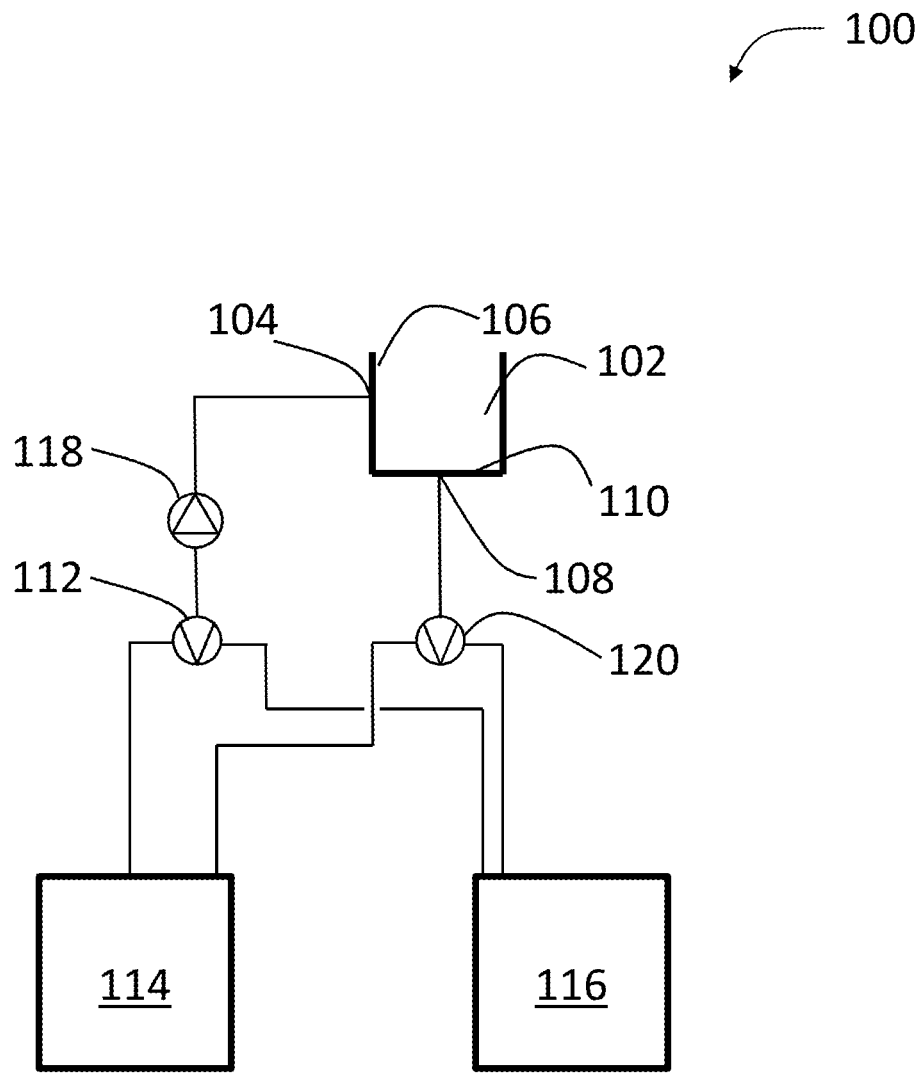
FIG. 1 illustrates a schematic view of a washing apparatus, according to some embodiments.

FIG. 1 schematically illustrates a washing apparatus 100 according to some embodiments. The apparatus 100 includes a vessel 102 in which one or more parts to be washed may be placed. In the example of FIG. 1, vessel 102 includes an inlet 104 formed in a side surface 106 and a drain 108 formed in a bottom surface 110. It should be understood that the inlet and drain may be otherwise positioned (e.g., the inlet may be in a bottom surface, the drain may be in a side surface, etc.). It should also be understood that the vessel may include multiple inlets (e.g., on side surfaces) and multiple drains (e.g., on bottom surfaces) in some embodiments. For example, the vessel may include one or more drains (e.g., on side surfaces near the top of the vessel) which may help prevent solvent overflow.

According to some embodiments, washing apparatus 100 may comprise, or may be coupled to, one or more controllers (e.g., processors) that may control various elements of apparatus 100 to be described below. In particular, the one or more controllers may open and close one or more valves and/or operate one or more pumps of the apparatus to perform a washing process as described below.

In the example of FIG. 1, apparatus 100 includes a first valve 112 coupled to a first container 114 (in which a first solvent may be stored) and a second container 116 (in which a second solvent may be stored). In some use cases, for instance, the first container 114 may contain isopropyl alcohol of a first concentration, and the second container 116 may contain isopropyl alcohol of a second concentration, different from the first concentration, or may instead contain a different liquid, such as water.

According to some embodiments, the first valve 112 may have a first configuration which enables the first solvent to flow through the valve to the inlet, while blocking the flow of the second solvent through the valve. The first valve may also have a second configuration in which the second solvent is able to flow through the valve to the inlet, while the valve blocks the flow of the second solvent through the valve. In some embodiments, the first valve may also have a third configuration which blocks the flow of either solvent through the valve.

In the example of FIG. 1, a pump 118 is arranged between the first valve 112 and the inlet 104 and is configured to pump the solvent flowing through the first valve 112 through the inlet 104 and into the vessel. Pump 118 may include any suitable pump, including a self-priming pump, a positive-displacement pump or a centrifugal pump.

In the example of FIG. 1, the apparatus 100 includes a second valve 120 coupled to the drain of the vessel. The second valve may have a first configuration in which the first solvent drained from the vessel passes to the first container 114, and may have a second configuration in which the second solvent drained from the vessel passes to the second container 116. In some embodiments, the second valve also may have a third configuration which blocks the flow of either solvent through the valve.

In some embodiments, the vessel 102 may comprise one or more overflow-prevention outlets (e.g., within the top edge and within side surface 106 inside the vessel) to prevent wash solvent from overflowing the vessel. The overflow-prevention outlets may in some embodiments be connected to pipes or other vessel that connect to either or both containers via respective valves.

Although not shown in FIG. 1, in some embodiments, instead of relying on different valves to select different containers (e.g., first container 114 or second container 116), the apparatus may include multiple pumps each coupled to one of the two containers 114 and 116 that may be operated to direct wash solvent into the vessel 104 with the selected solvent.

In some embodiments, the wash solvent in the vessel during a wash may be agitated to improve the results of washing. For instance, the wash solvent may be continuously circulated by continuously operating the pump 118 while keeping the drain of the vessel open. Additionally, or alternatively, the wash solvent may be agitated within the vessel 104 mechanically by one more impellers or other moving mechanical elements located inside the vessel.

Figure 2A:
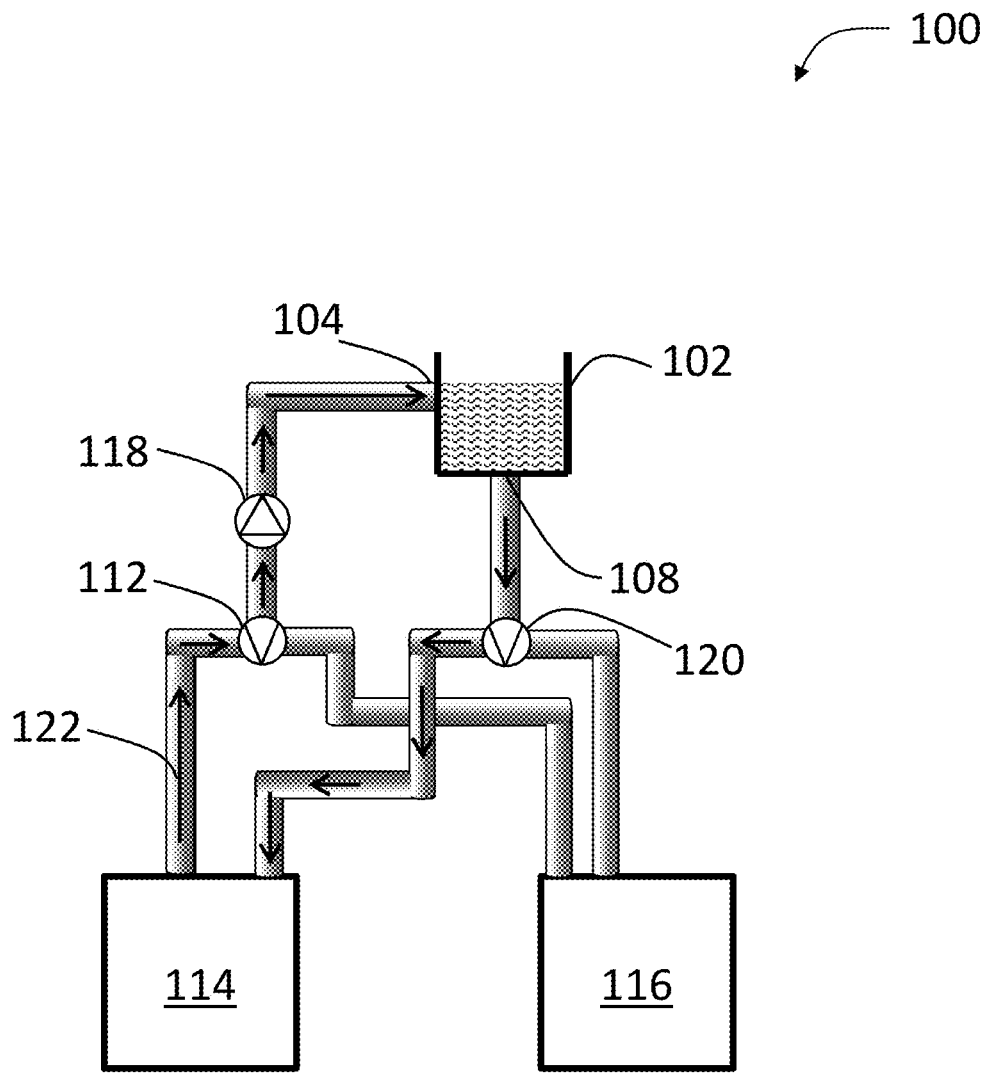
FIGS. 2A and 2B illustrate a schematic view of a washing apparatus during use, according to some embodiments.

During use, one or more additively fabricated parts are first placed in vessel 102. FIG. 2A schematically illustrates a first wash cycle which utilizes first solvent 122. To begin the first wash cycle, valve 112 is operated into its first configuration and/or pump 118 is operated to produce a flow of the first solvent (following the arrows in the drawing) from container 114 to pump 118 and through inlet 104. In some use cases, the first solvent may be directed into the vessel 102 until a desired amount of the first solvent may be directed into the vessel. For instance, valve 120 may be operated into a configuration that prevents the flow of any solvent through the valve 120 when the desired amount has been directed into the vessel. The desired amount may, for example, be sufficient to immerse (partially or completely) the one or more parts in the solvent. When a desired amount of solvent is accumulated in the vessel, valve 120 may be operated into its first configuration which enables the first solvent to drain from the vessel and to return to first container 114. In some embodiments, the operation of the pump and valves are coordinated so that the amount of first solvent in the vessel remains relatively constant and, e.g., sufficient to immerse the part.

It should be understood that, in some methods, valve 120 may be operated to be in a configuration that enables the first solvent to drain from the vessel as soon as valve 112 is operated into its first configuration and/or pump 118 is operated to enable the flow of the first solvent through the inlet. In some such methods, little or no first solvent may be accumulated in the vessel and/or the part is not completely immersed. For example, in some such methods, the first solvent may spray or flush the part to clean it and then drain without accumulating liquid in the vessel.

The first wash cycle may last for any suitable amount of time. For example, the first wash cycle may last for one minute, five minutes, ten minutes, twenty minutes, thirty minutes, an hour, or two hours. To end the first wash cycle, the pump 118 is operated so that it no longer pumps the solvent, and/or valve 112 is operated into a configuration that prevents the flow of the first solvent through the valve. In some cases, the valve 112 is operated immediately into a configuration that enables the flow of the second solvent through the valve to commence the second wash cycle. In other cases, the valve is first operated into a configuration that prevents the flow of both solvents through the valve for a brief time period (e.g., to permit draining of all of the first solvent from the vessel) and then the valve is operated into a configuration that enables the flow of the second solvent through the valve to commence the second wash cycle, e.g., when the pump is re-started. In some embodiments, the washing apparatus includes a third container (not shown in FIG. 2A) including flush liquid (e.g., water) that is used to flush the vessel between the first wash cycle and the second wash cycle. For example, the third container may be coupled to the first valve and the second valve in the same configuration as the first container and the second container. During the flush cycle, the first valve is placed in a configuration that allows flush liquid from the third container to flow through the pump and into the vessel through outlet 104. The second vale is placed in a configuration that enables the flush liquid to leave the vessel and flows back into the third container.

Figure 2B:
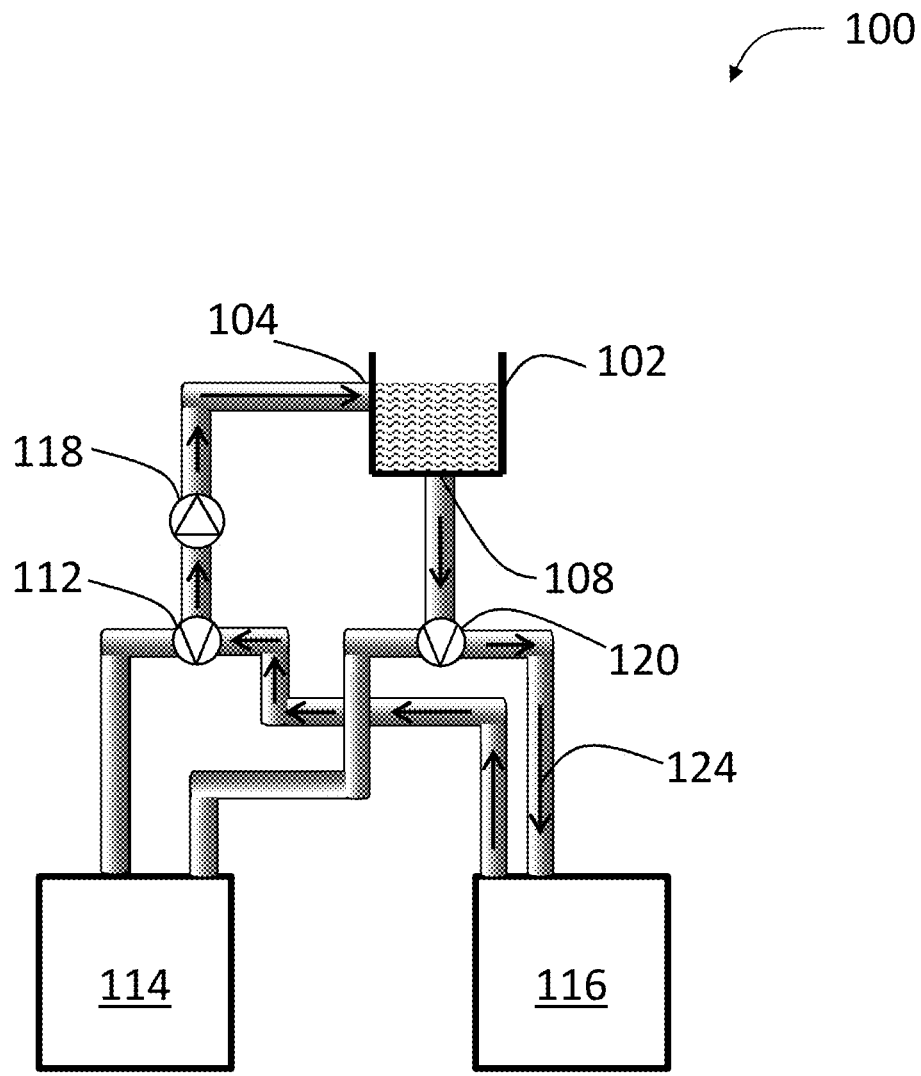

FIG. 2B schematically illustrates a second wash cycle which utilizes second solvent 124. As described above, in the second wash cycle, valve 112 is in a configuration that enables the flow of the second solvent (following arrows) from container 116 to pump 118 and through inlet 104. In some methods, the vessel may be filled with a desired amount of the second solvent (e.g., with valve 120 operated to be in a configuration that prevents the flow of any solvent through the valve) which may be sufficient to immerse the part in the solvent. When a desired amount of solvent is accumulated in the vessel, valve 120 may be operated into its first configuration which enables the second solvent to drain from the vessel and to return to second container 116. In some embodiments, the operation of the pump and valves are coordinated so that the amount of second solvent in the vessel remains relatively constant and, e.g., sufficient to immerse the part.

It should be understood that, in some methods, valve 120 may be operated to be in a configuration that enables the second solvent to drain from the vessel as soon as valve 112 is operated into its first configuration and/or pump 118 is operated to enable the flow of the second solvent through the inlet. In some such methods, little or no second solvent may be accumulated in the vessel and/or the part is not completely immersed. For example, in some such methods, the second solvent may spray the part to clean it and then drain without accumulating liquid in the vessel.

The second wash cycle may last for any suitable amount of time. For example, the first wash cycle may last for one minute, five minutes, ten minutes, twenty minutes, thirty minutes, an hour, or two hours. To end the second wash cycle, the pump 118 is operated so that it no longer pumps the solvent, and/or valve 112 is operated into a configuration that prevents the flow of the second solvent through the valve. In some cases, the valve is moved immediately to a configuration that enables the flow of the first solvent through the valve to commence another wash cycle using the first solvent. In other cases, the valve is first operated into a configuration that prevents the flow of both solvents through the valve, for example, for a brief time period (e.g., to permit draining of all of the first solvent from the vessel) and then the valve is operated into a configuration that enables the flow of the first solvent through the valve to commence another wash cycle using the first solvent. In some methods, valve 112 is operated into a configuration that prevents the flow of both solvents through the valve and/or the pump is stopped to end the washing process with no further washing cycles. When the wash cycle is complete, the part may be removed from the vessel, for example, and dried.

It should be understood that the methods may utilize any suitable number of wash cycles.

Figure 3:
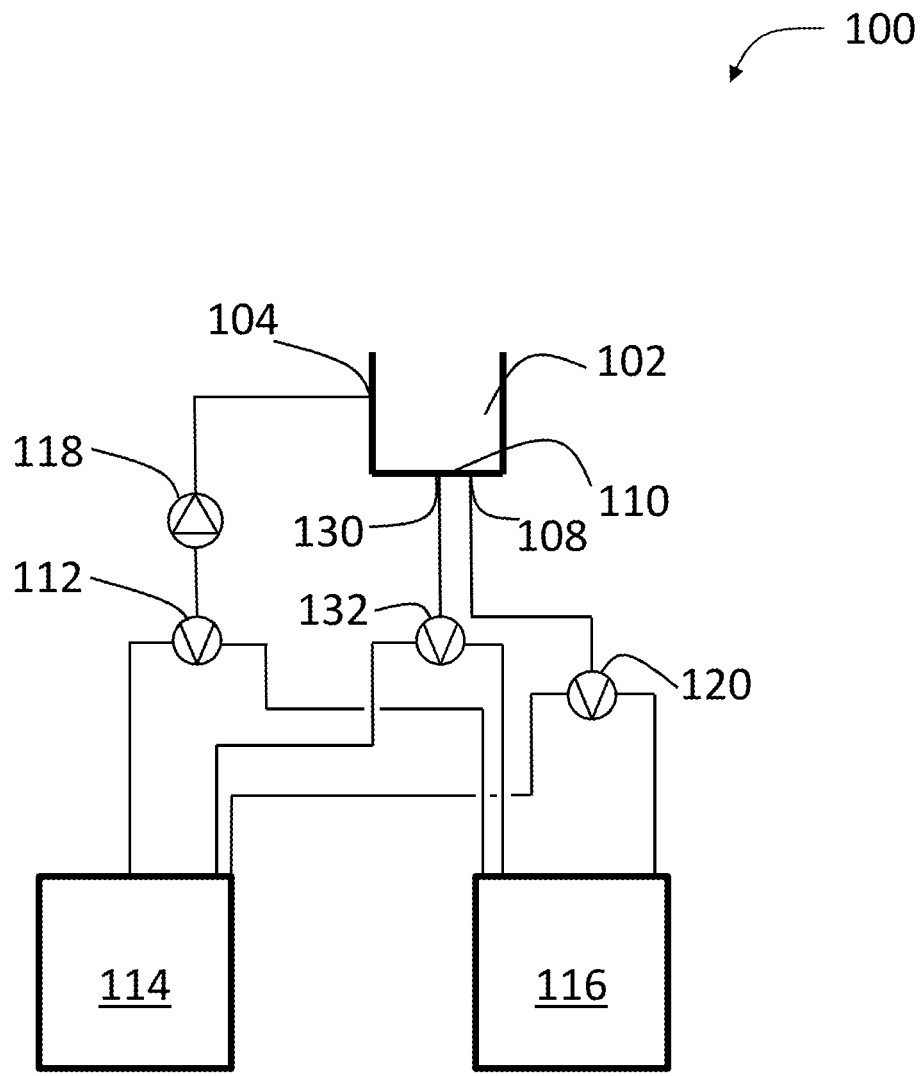
FIG. 3 illustrates a schematic view of a washing apparatus including a vessel including multiple drains, according to some embodiments.

FIG. 3 illustrates a schematic view of a washing apparatus including a vessel which including multiple drains, according to some embodiments. As shown, the vessel includes drain 108 and a second drain 130 formed in bottom surface 110. As described above, second valve 120 is coupled to drain 108. In the example of FIG. 3, a third valve 132 is coupled to a second drain 130. The third valve has a first configuration that enables the return of the first solvent drained from the vessel to first container 114, and has a second configuration which enables the return of the second solvent drained from the vessel to second container 116. In some embodiments, the third valve also may have a third configuration which prevents the flow of solvent through the valve.

It should be understood that the washing apparatus may include any number of drains and corresponding valves.

Figure 4:
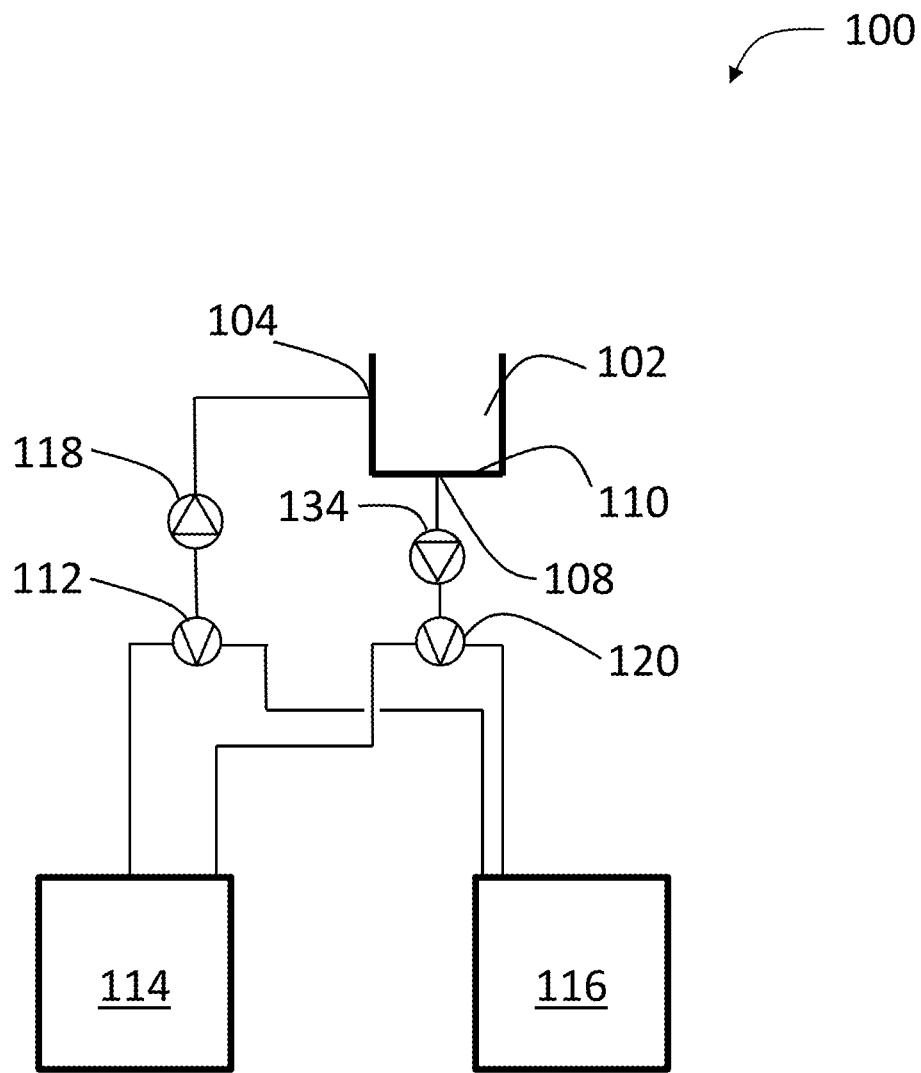
FIG. 4 illustrates a schematic view of a washing apparatus including a vessel including multiple pumps, according to some embodiments.

FIG. 4 illustrates a schematic view of a washing apparatus including a vessel which including multiple pumps, according to some embodiments. In addition to pump 110 described above, the apparatus includes a second pump 134 coupled to drain 108. During use, the second pump may be operated to pump solvent draining from the vessel and returning to the appropriate container (114 for the first solvent or 116 for the second solvent).

It should be understood that the washing apparatus may include any number of pumps which may be located at different positions and which may be operated to generally enhance the flow of solvent through the apparatus.

Figure 5:
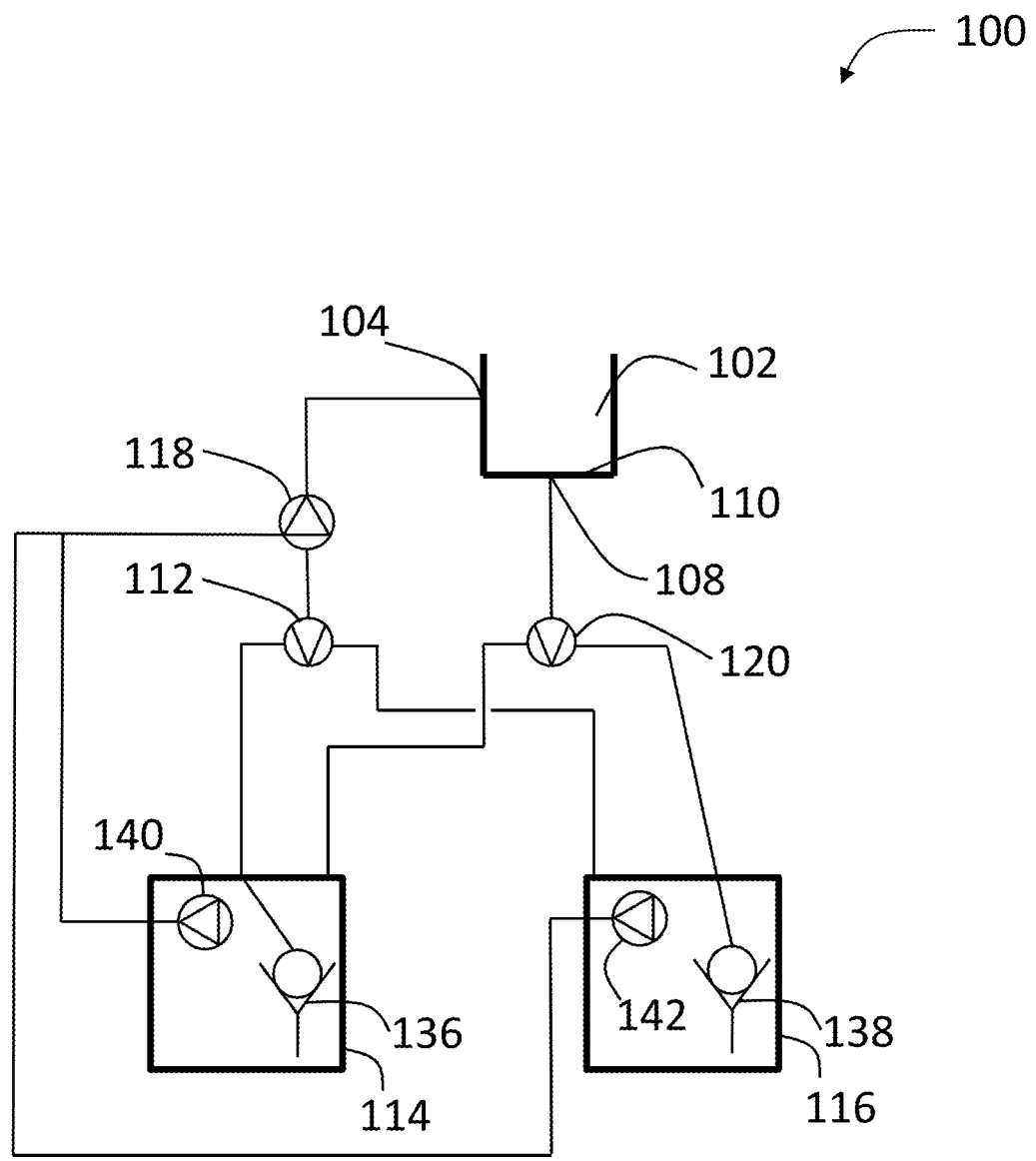
FIG. 5 illustrates a schematic view of a washing apparatus including respective pumps and valves located inside the storage containers, according to some embodiments.

FIG. 5 illustrates a schematic view of a washing apparatus including respective pumps and valves located inside storage containers, according to some embodiments. As shown, a secondary pump 140 is located inside of container 114 and a secondary pump 142 is located inside of container 116. In this embodiment, a valve 136 is located inside of container 114 and a valve 138 is located inside of container 116. Valve 136 may be coupled to pump 118, valve 112 and to an outlet of container 114 to control solvent flow out of the container. Valve 138 may be coupled to valve 120 and to an outlet of container 116 to control solvent flow out of the container.

It should be understood that the washing apparatus may include a number of variations and/or additional components that are not illustrated. For example, the apparatus may include one or more filter(s) constructed and arranged to filter solvent. The filter(s) may be positioned at any suitable location(s) in the apparatus (e.g., coupled to and arranged between the drain of the vessel and the second valve). In some embodiments, the apparatus may include a fan, e.g., arranged above the vessel and oriented to direct air into the vessel. In some embodiments, the storage containers may include an outlet separate from the inlet. In some embodiments, the apparatus may include a first level sensor located in the first storage container configured to sense a level of solvent in the first storage container. In some embodiments, the apparatus may include a first saturation sensor located in the first storage container configured to sense whether a solvent in the first storage container is saturated with a target solute. Additional components and/or variations are also possible.

Figure 6:
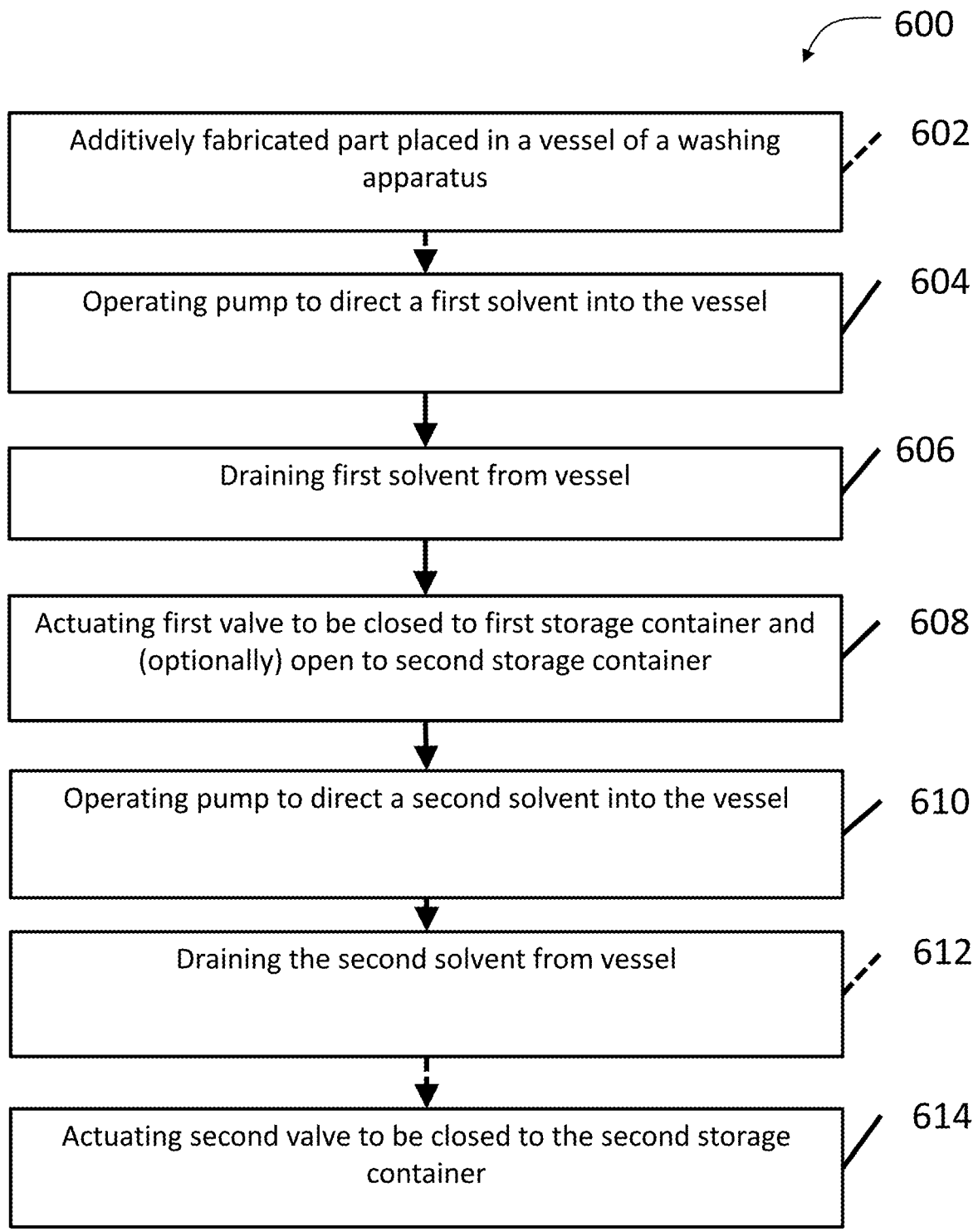
FIG. 6 illustrates process steps for washing an additively fabricated part, according to some embodiments.

FIG. 6 is a flowchart of a washing method 600 according to some embodiments. Washing method 600 may be performed by any of the washing apparatus as described herein, including but not limited to those illustrated in FIGS. 1-5 and described above.

As described above, in general a washing apparatus may comprise an open-topped vessel that includes a drain and one or more inlets. The apparatus may also include a first storage container, a second storage container, and a first valve coupled to the first storage container and the second storage container. A pump may be coupled to the first valve, the first storage container, the second storage container and the one or more inlets. A second valve may be coupled to the drain of the vessel, the first storage container and the second storage container.

Method 600 begins with act 602 in which one or more additively fabricated parts may be placed in a vessel of the washing apparatus. As described above, for example, the part may be made in a stereolithography process and may comprise a hardened photopolymer (e.g., a resin), but any suitable types of additively fabricated parts may be utilized in method 600.

In act 604, a pump is operated using at least one controller to direct a first solvent from the first storage container into the vessel through the one or more inlets while the first valve is in a configuration open to the first storage container and closed to the second storage container. As described above, the first solvent may spray the part. Alternatively, or in addition, the first solvent may accumulate in the vessel to, in part or completely, immerse the part.

In act 606, one or more pumps and/or valves may be operated to cause the first solvent to be drained from the vessel through the drain and through the second valve into the first storage container. In some embodiments, the acts 604 and 606 may be performed at the same time (may start and/or end together, or may otherwise overlap in time) to circulate the solvent while washing the part(s).

In act 608, the first valve is operated into a configuration by the at least one controller so that the first valve is closed to the first storage container. In the same or in a subsequent actuation step, the first valve is operated into a configuration to be open to the second storage container. The controller may generate an alert when the first valve is closed to the first storage container and/or open to the second storage container. This alert may be communicated to a user in any suitable way, including by producing a visual indication on a display of the apparatus.

In act 610, the pump is operated using the at least one controller to direct a second solvent from the second storage container into the vessel through the one or more inlets while the first valve is operated to be closed to the first storage container and open to the second storage container. As described above, the second solvent may spray the part. Alternatively, or in addition, the first solvent may accumulate in the vessel to, in part or completely, immerse the part.

In act 612, the second solvent is drained from the vessel through the drain and the second valve into the second storage container. In some embodiments, the act 610 and the act 612 can happen in parallel for fluid circulation.

In act 614, the first valve is operated by the at least one controller into a configuration using the at least one controller so that the first valve is closed to the second storage container. The controller may generate an alert when the first valve is closed to the second storage container. This alert may be communicated to a user in any suitable way, including by producing a visual indication on a display of the apparatus.

In some embodiments, act 614 is the last step in the washing method. After washing is complete, the part may be removed from the vessel and dried. In other embodiments, act 614 involves actuating the first valve to a configuration that is open to the first storage container and steps 604-614 are repeated.

Figure 7:
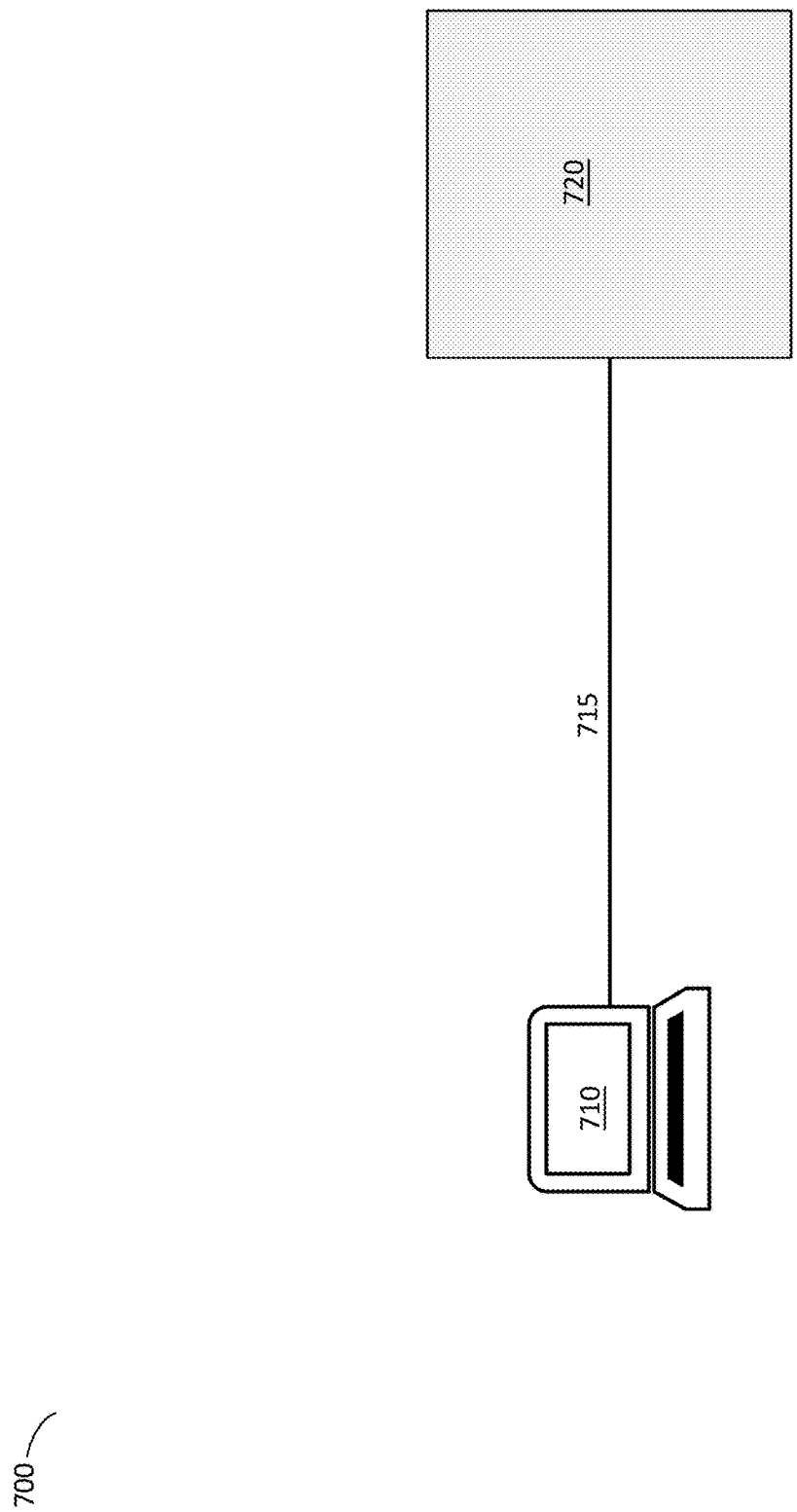
FIG. 7 is a block diagram of a system suitable for practicing aspects of the invention, according to some embodiments.

FIG. 7 is a block diagram of a system suitable for practicing aspects of the invention, according to some embodiments. System 700 illustrates a computing system 710 suitable for controlling a washing process performed by a washing apparatus 720, as described above and shown in the figures. In the example of FIG. 7, computer system 710 may control any one or more aspects of the washing apparatus 720, such as one or more valves and/or one or more pumps, by communicating with the apparatus over communication path 715. The computer system 710 may perform a washing process as described above in relation to FIG. 6 and method 600, and may receive user input relating to such a process at the start and/or during the process. For instance, the computer system 710 may initiate the method 600 in response to user input provided to the computer system, and/or the computer system may initiate may initiate particular acts within method 600 in response to user input provided to the computer system (e.g., the end of the first wash cycle may be initiated in act 608 in response to user input).

According to some embodiments, computer system 710 may comprise software executing a general-purpose processor, an application specific integrated circuit (ASIC), an FPGA, and/or any other suitable controller suitable for controlling the washing apparatus 720. In some embodiments, the communication path 715 may comprise any suitable wired and/or wireless communications connection. In some embodiments, a single housing holds the computing device 710 and washing apparatus 720 such that the link 715 is an internal link connecting two modules within the housing of system 700.

FIG. 8 illustrates an example of a suitable computing system environment 1200 on which the technology described herein may be implemented. For example, computing environment 1200 may form some or all of the computer system 710 shown in FIG. 7. The computing system environment 1200 is only one example of a suitable computing environment and is not intended to suggest any limitation as to the scope of use or functionality of the technology described herein. Neither should the computing environment 1200 be interpreted as having any dependency or requirement relating to any one or combination of components illustrated in the exemplary operating environment.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the technology described herein includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a flash drive 851 that reads from or writes to a removable, nonvolatile memory 852 such as flash memory, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

FIGS. 9A-9D illustrate various exemplary configurations of a tomographic lithographic printing device according to some embodiments. Tomographic lithography may also be referred to as volumetric additive manufacturing or volumetric printing.

In FIG. 9A, a projector unit 902 produces controllable patterns of light directed to a photo-responsive material 904 (also referred to herein as a photopolymer) inside a container 906. The container 906 is optically transparent to the wavelength of the light produced by the projector unit 902. In FIG. 9A, the container 906 is fixed on, or otherwise attached to, a rotating platform 908 such that the orientation of the photo-responsive material 904 relative to the beam of light may be controllably varied in one or both rotation directions, either continuously or in incremental steps. As the container 906 rotates on the rotating platform 908, a pattern generated by the projector unit 902 may be varied so that desired volumes of the photo-responsive material 904 are being illuminated.

FIG. 9B illustrates a similar setup to that in FIG. 9A, but the rotation platform 910' is affixed to the top of the container 906. In some embodiments, the rotation platform 910' is attached to a supporting unit 912 located next to the rotation platform 910'.

FIG. 9C illustrates a setup in which the container 906 is fixed in space and two or more projector units (e.g., projector units 902b-d) produce controllable patterns of light directed to the photo-responsive material 904 inside the container 906. The two or more projector units may produce light that together covers the entire periphery of the container 906 such that desired volumes of the photo-responsive material 904 are illuminated without it being necessary to rotate the container 906. In some embodiments, not shown in FIG. 9C, the container 906 may be fixed in space and a projector unit (e.g., the projector unit 902b) is operated to rotate around the container 906 (e.g., along a pre-installed track) to generate varying patterns to cure desired volumes of the photo-responsive material 906 in the container 906.

In FIG. 9D, a region of the photo-responsive material 904 that has been cured are represented with a shape 914. The container 906 and the photo-responsive medium 904 together form the build volume. The container 906 may for example be a cylindrical vial made of glass or plastic or any light-transparent material. The build region may for example be 1 cm wide to 15 cm wide and 1 cm tall to 15 cm tall.

The optical absorption length at the wavelength of the photo-altering radiation in the photo-responsive material 904 may for example be tuned to be longer than the build volume width.

According to some embodiments, the projection unit 902 may include any a device that may produce spatial patterns of light. The projection unit 902 may for example include a directly modulable light source such as an LED array, or it may include a light source with a fixed spatial profile (such as a laser or an LED) combined with a spatial light modulator. The spatial light modulator may consist of galvanometer-scanners, a liquid crystal spatial light modulator, or a digital micromirror device (DMD). The generated patterns of light may be zero-dimensional (spots), one-dimensional (lines), two-dimensional (images), or three-dimensional (holograms). One skilled in the art will understand that the projection unit 902 may incorporate additional optical elements, for example a cylindrical lens to correct for the distortion caused by a cylindrical container, or relay lenses to accurately project the light patterns inside the build volume. The projection unit 902 may be coupled to a computing device that controls the spatial patterns of light produced by the projection unit.

Figure 10A:
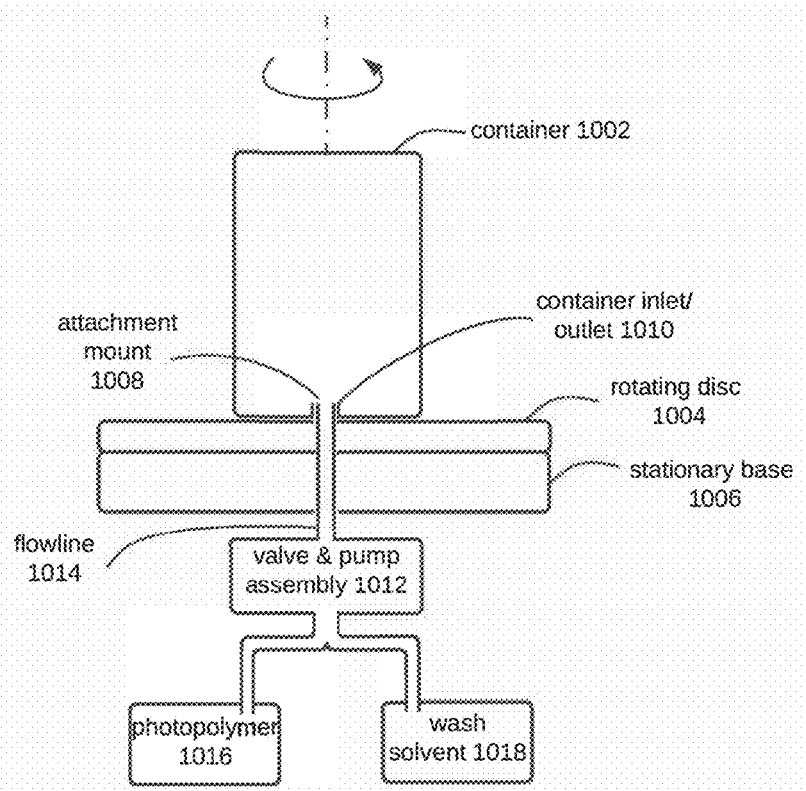
FIGS. 10A-10B illustrate various exemplary configurations of a container with inlets and outlets connected to different solvent containers according to some embodiments.
Figure 10B:
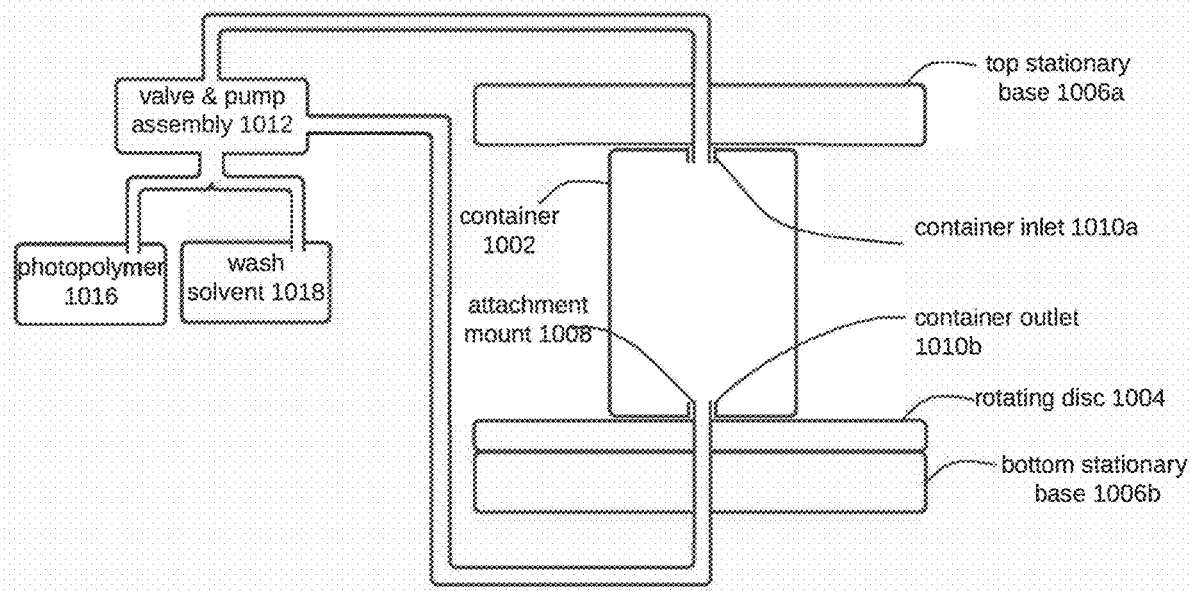

FIGS. 10A-10B illustrate various exemplary configurations of a container with one or more inlets and/or outlets connected to different solvent containers, according to some embodiments. These described configurations may allow for an automated wash process of a part fabricated through tomographic lithography, as will be described in more detail in FIGS. 11A-11G.

In FIG. 10A, container 1002 (e.g., the container 906 in FIG. 9A) is placed on top of rotating disc 1004 (e.g., in the center of the rotating disc 1004). The rotating disc 1004 is rotationally coupled to a stationary base 1006, which stays stationary while the rotating disc 1004 rotates with the container 1002 (e.g., as part of the tomographic lithography process as described in FIGS. 9A-9D). For example, the rotating disc 1004 and the stationary base 1006 can both be part of the rotating platform 908 as described in FIGS. 9A-9D. In some embodiments, the container 1002 includes an attachment mount 1008 that fixedly couples the container 1002 to the rotating disc 1004. For example, the attachment mount 1008 may include thread-based attachment, tabs-based attachment, magnet-based attachment, friction-based attachment, etc. Due to the symmetric shape of the rotating disc 1004 and the container 1002, the attachment mount 1008 can be located at the center of the bottom surface of the container 1002, and attaches the container 1002 to the center of the rotating disc 1004. As a result, during tomographic lithography, the container 1002 and the rotating disc 1004 may remain concentric.

In some embodiments, the container 1002 includes one or more inlets/outlets 1010 that allows photopolymer or other liquid material to flow into/out of the container 1002. For example, the inlet/outlet 1010 may be placed inside the attachment mount 1008 or be part of the attachment mount 1008. The inlet/outlet 1010 is coupled to a valve & pump assembly 1012 through flowline 1014. For example, the flowline 1014 runs through the rotating disc 1004 and the stationary base 1006. A sealing device such as a rubber O-ring can be used to prevent liquid spill at the interface between the inlet/outlet 1010 and the flowline 1014.

The valve & pump assembly 1012 is connected to different liquid containers such as photopolymer container 1016 and wash solvent container(s) 1018. The valve system of the valve & pump assembly 1012 opens and closes different flow paths between the container 1002 and the various liquid containers, and the pump system of the valve & pump assembly 1012 pumps liquid to move around the flow paths. Although not shown in FIG. 10A, the valve system and the pump system can be two separate systems to control the liquid flow around different flow paths. For detail of the valve & pump assembly 1012, refer to FIGS. 1-5 and the related descriptions.

FIG. 10B illustrates a wash system similar to that in FIG. 10A, but the container 1002 includes a separate inlet 1010a and a separate outlet 1010b, with the inlet 1010a located at the top of the container 1002 and the outlet 1010b located at the bottom of the container 1002. An advantage of separating the inlet 1010a from the outlet 1010b is that, as the wash solvent 1018 flows into the container during the automated wash process, the agitation of wash solvent due to gravity provides better cleaning effect on the newly printed part in the container 1002.

FIGS. 11A-11G illustrate an exemplary process in which an object produced during tomographic lithographic printing is automatically washed within a container according to some embodiments. For the ease of description, the wash system configuration in FIG. 10A is used to illustrate the automated wash process. In practice, the automated wash process can be implemented on other systems such as those described in FIG. 9A-9D or 10B.

Figures 11A, 11B:
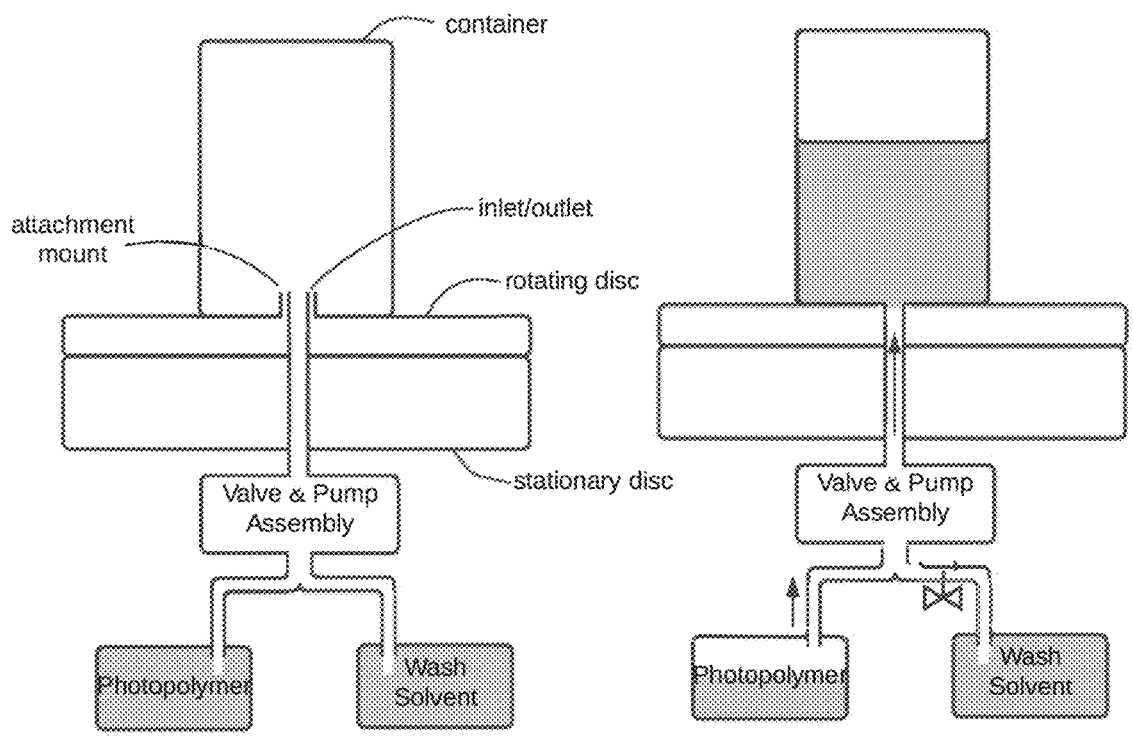
FIGS. 11A-11G illustrate an exemplary process in which an object produced during tomographic lithographic printing is automatically washed within a container according to some embodiments.

In FIG. 11A, the container is connected to the liquid containers but remains empty. Next, the valve & pump assembly connects the photopolymer container with the container, and pumps photopolymer into the container. As a result, the container is gradually filled with photopolymer 1102, and the photopolymer container is gradually emptied. It may be appreciated that the container need not be completed filled with the photopolymer 1102, and some space may be left within the container. In addition, the container may include one or more vents for allowing air to escape from the container as the pump directs the photopolymer into the container.

Figures 11C, 11D:
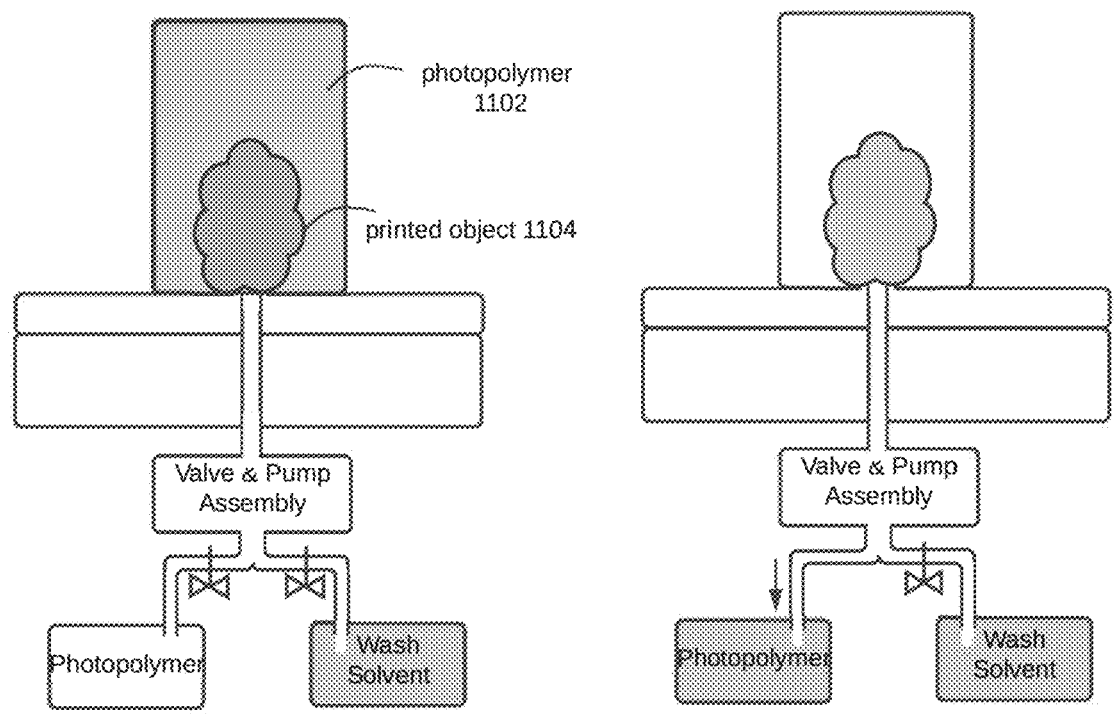
Figure 11E:
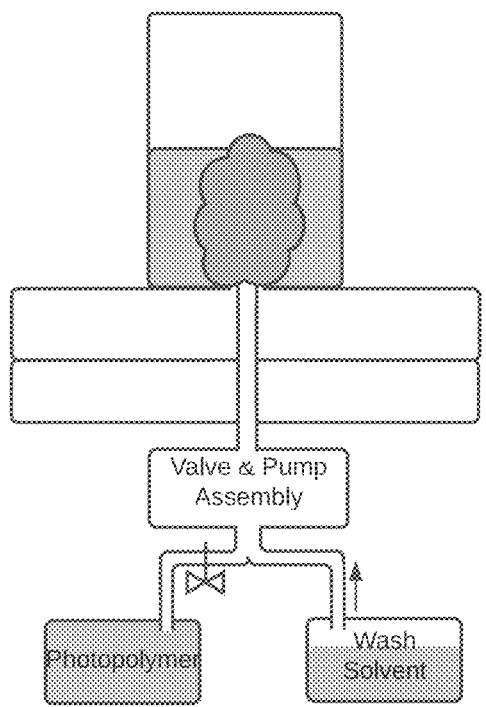

FIG. 11C illustrates that, after a tomographic lithography printing session, a printed object 1104 is produced within the container and is immersed in the uncured photopolymer 1102.

FIG. 11D illustrates the beginning of the automated wash process, with the valve & pump assembly first drains the uncured resin from the container back to the photopolymer container (e.g., after filtering to ensure photopolymer purity). Next, in FIG. 11E, the valve & pump assembly closes the flow path between the photopolymer container and the container, and opens the flow path between the wash solvent container and the container. The pump system then starts to pump wash solvent into the container.

Figure 11F:
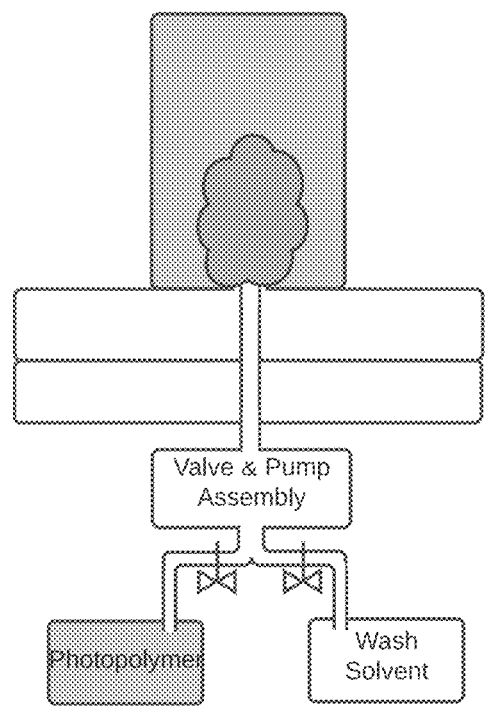

FIG. 11F shows that the printed object 1104 is completely immersed in wash solvent. For example, the wash solvent may be isopropyl alcohol (IPA). In some embodiments, additional agitation of the wash solvent may be implemented to enhance washing effects. For example, a magnetically coupled stirring device may be used in the container to agitate the wash solvent. In some embodiments, the wash solvent may be heated to enhance washing effects as well (e.g., the rotating disc may work as a heating pad).

Figure 11G:
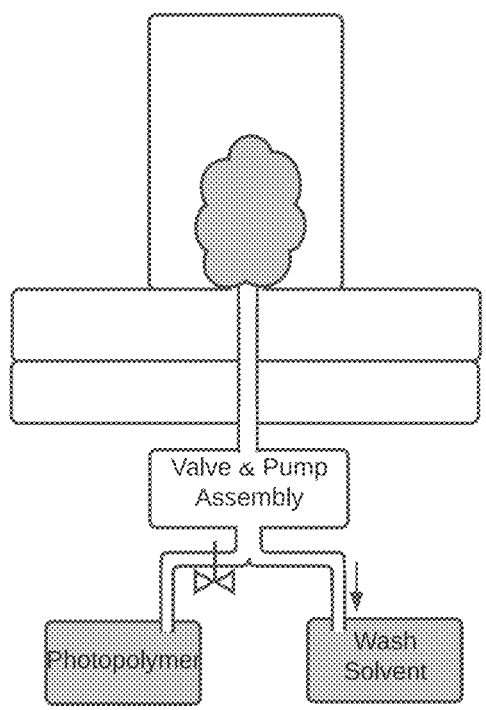

FIG. 11G shows that after the printed object 1004 is washed with the wash solvent, the valve & pump assembly pumps the wash solvent (e.g., after filtering) back into the wash solvent container. As a result, a fully washed object 1102 is present in the container and can be removed for direct application.

Although not shown, multiple different wash solvent containers can be connected to the container. As a result, a wash cycle that includes washing the printed object with multiple different solvents in sequence can be used (e.g., see FIGS. 1-5 and the related description).

The described automated washing process provides numerous advantages over the traditional manual washing process used after tomographic lithography printing. First, an operator no longer has to come into contact with photopolymer as all resin is removed from the container after the wash cycle. This ensures the purity of the resin for future printing and provides a clean working environment. Further, since the build volume in tomographic lithography is usually small (e.g., constrained by the size of the container and the penetration depth of light in resin), most printed objects are of rather small size. Washing these smaller objects in traditional large washing tank, especially when together with other printed parts, presents inconvenience as to locating and identifying the small objects after a wash cycle. In some situations, the small parts may be prone to damage in large washing tanks. The described automated washing process provides a superior solution as the part is ready for use as soon as it leaves the container, and no additional post processing is required.

FIGS. 12A-12D illustrate an exemplary process in which an object produced during a tomographic lithographic printing is automatically removed from a container and washed according to some embodiments. The automated wash process described in FIGS. 12A-12D involves physically removing the printed object 1202 from the container, while the automated wash process described in FIGS. 11A-11G involves washing the printed part in the container itself.

Figure 12A:
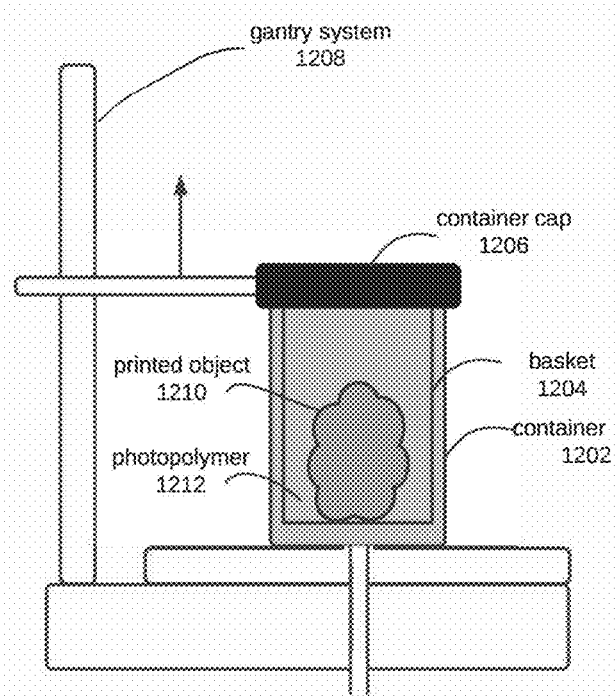
FIGS. 12A-12D illustrate an exemplary process in which an object produced during a tomographic lithographic printing is automatically removed from a container and washed according to some embodiments.

FIG. 12A illustrates that a printed object 1210 is immersed in uncured photopolymer 1212 in a container 1202, after a tomographic lithography printing session. The container 1202 includes a container cap 1206 that is coupled to a gantry system such that the container cap can be detached from the container 1202 and repositioned in space. A basket 1204 is attached to the container cap 1206, and the printed object 1210 rests in the basket 1204.

Figure 12B:
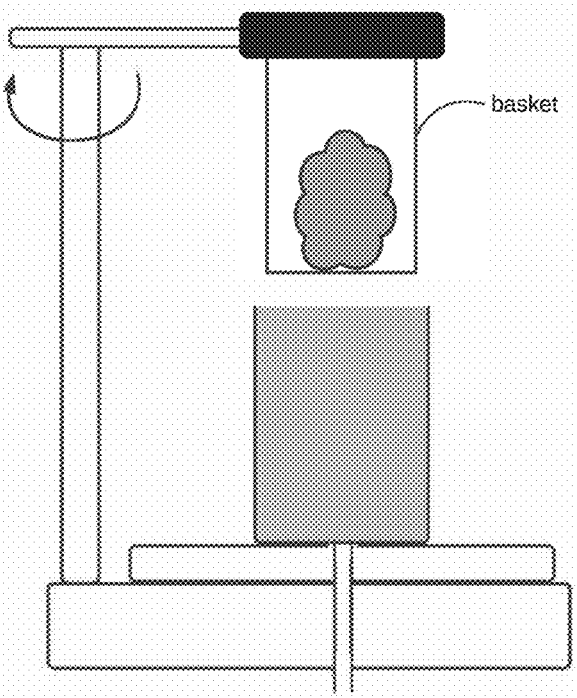
Figure 12C:
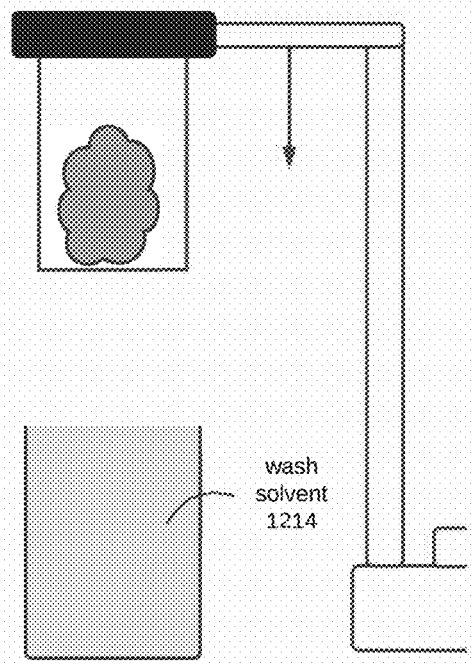
Figure 12D:
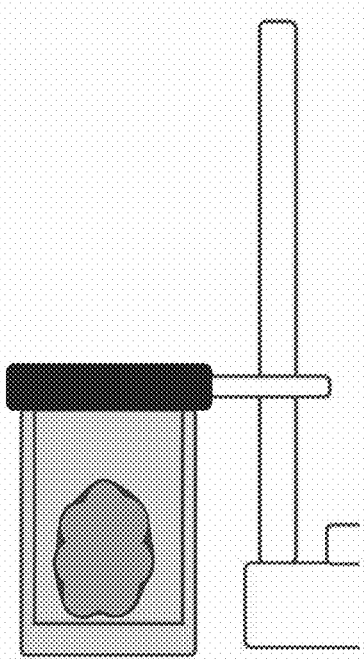

FIGS. 12B-12D illustrate that the gantry system 1208 moves (e.g., through translation and rotation) the basket 1204 with the printed object 1210 and reposition them to be immersed in wash solvent 1214. Although not shown, the gantry system 1208 can be used to remove and place the basket 1204 and the printed object 1210 in different post-processing devices, including a container with a different solvent, or a device for heating, air-drying, or curing the printed object 1210.

Figure 13A:
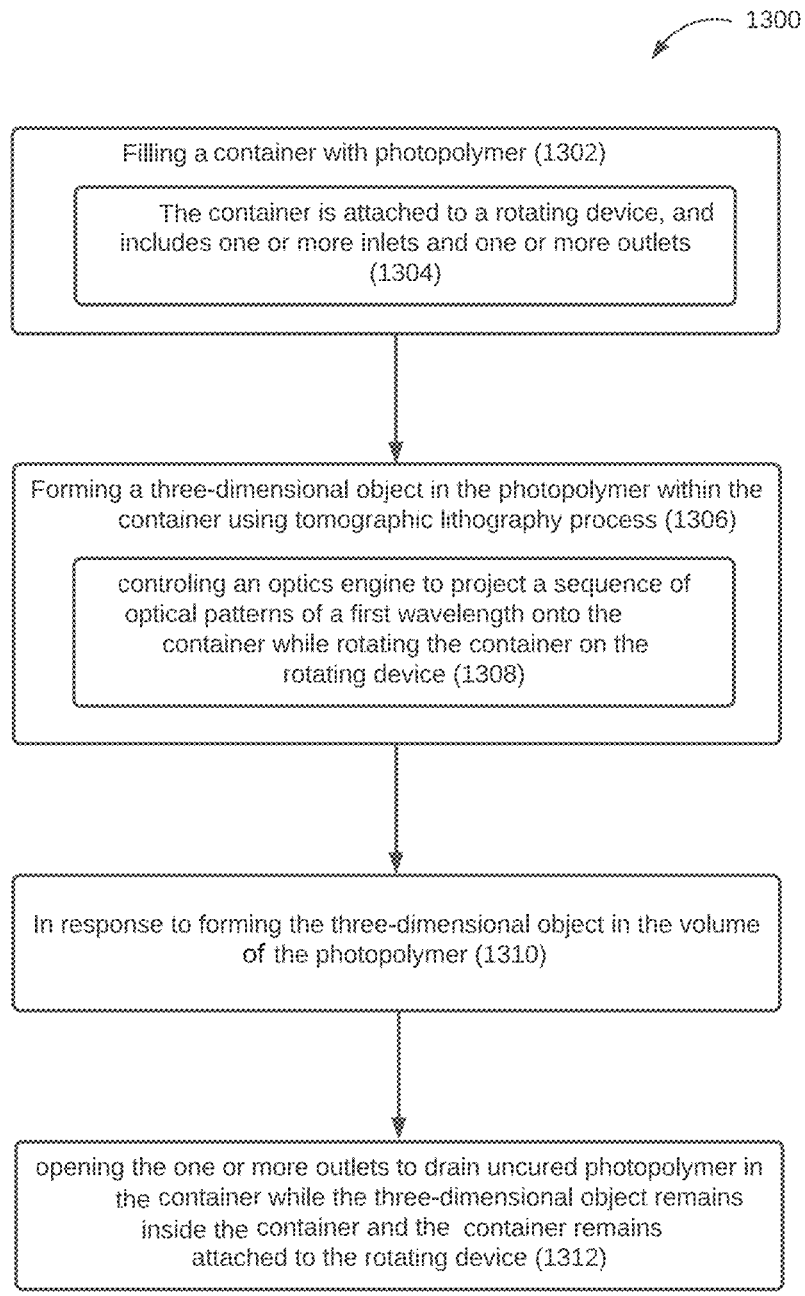
FIGS. 13A-13B illustrate exemplary flowcharts depicting automated post-processing process according to some embodiments.
Figure 13B:
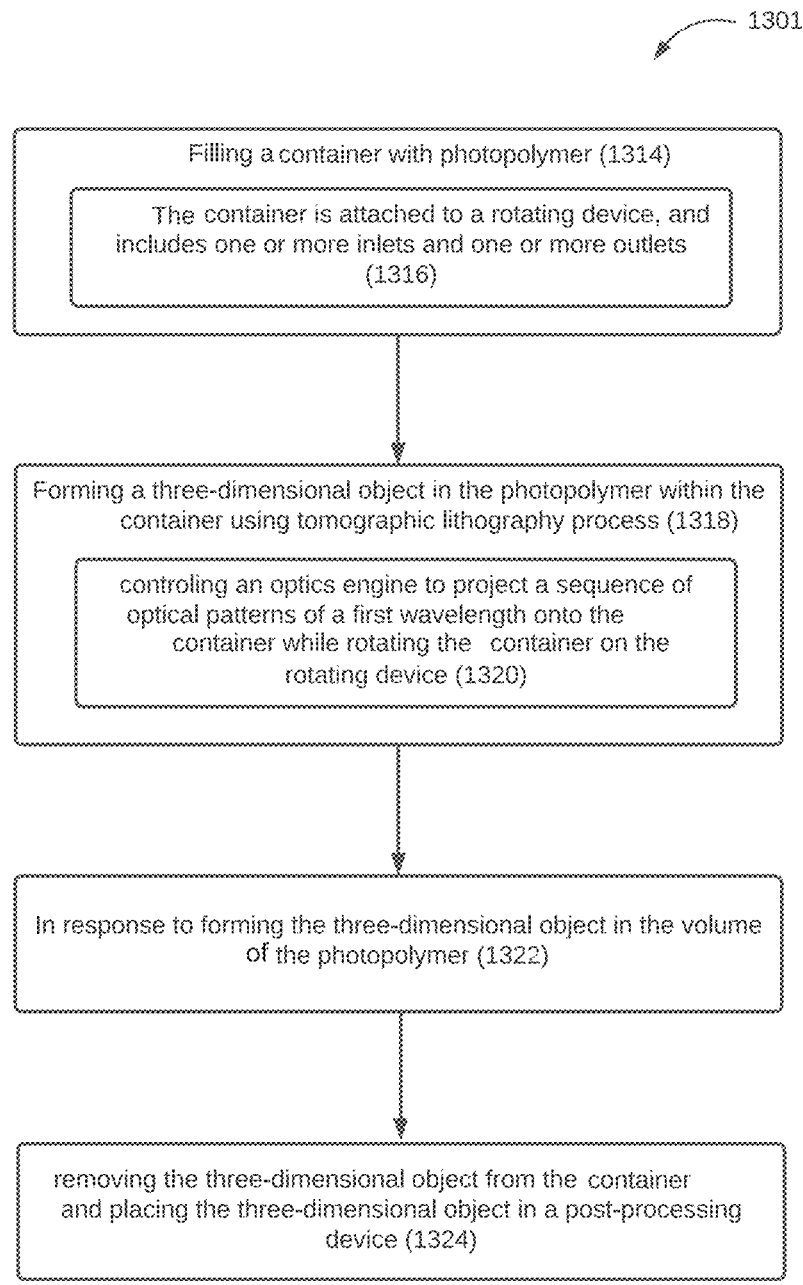

FIGS. 13A-13B illustrate exemplary flowcharts depicting automated post-processing processes 1300 and 1301 according to some embodiments. For convenience of description, processes 1300 and 1301 will be described as being controlled by a computer. For example, a computer that controls the light projector units 902 (FIG. 9A), the valve & pump assembly 1012 (FIG. 10A), or the gantry system 1208 (FIG. 12A).

FIG. 13A shows an automated wash process 1300 in which the printed object is washed within the container. The automated wash process 1300 starts when the computer controls the pump to first fill a container (e.g., made with optically transparent walls) with photopolymer (1302), wherein the container is removably attached to a rotating device (e.g., a rotating disk on top of which the container is mounted, or a device that grips the container and self-rotates) that is configured to rotate the container around a first axis (e.g., the vertical axis (also known as the z-axis) of the container), and the container includes one or more inlets (e.g., for injecting photopolymer, wash solvent, or other liquid into the container. In some embodiments, the inlets are located at a top portion of the container such that opening the inlets enables liquid to fill the container) and one or more outlets (e.g., for ejecting photopolymer, wash solvent, or other liquid into the container (1304). In some embodiments, the outlets are located at a bottom portion of the container such that opening the outlets enables liquid inside the container to flow out of the container under gravity force).

Next, the computer controls light projector(s) to form a three-dimensional object in the photopolymer within the container using a tomographic lithography (also known as computed axial lithography) process (1306), including: controlling an optics engine to project a sequence of optical patterns of a first wavelength (e.g., UV light) onto the container while rotating the container on the rotating device (e.g., the speed at which the container self-rotates is calculated to be in sync with the speed at which the sequence of optical patterns is played) (1308), thereby causing the sequence of optical patterns to irradiate the photopolymer from different angles (e.g., due to the self-rotation of the container) and curing a portion of the volume of photopolymer to form a three-dimensional object.

In response to forming the three-dimensional object in the volume of photopolymer (e.g., the object is rested on a bottom surface inside the container while being immersed in resin, or is suspended within the resin) (1310), the computer opens the one or more outlets (e.g., by a computer) to drain uncured photopolymer in the container while the three-dimensional object remains inside the container and the container remains attached to the rotating device (1312).

FIG. 13B illustrates another automated wash process 1301, in which the printed object is moved by a gantry system to be placed in wash solvent. A computer first controls a pump to fill a container with photopolymer (1314), wherein the container is removably attached to a rotating device that is configured to rotate the container around a first axis, and the container includes one or more inlets and one or more outlets (1316).

Next, the computer controls light projector(s) to form a three-dimensional object in the photopolymer within the container using a computed axial lithography process (1318), including: controlling an optics engine to project a sequence of optical patterns of a first wavelength onto the container while rotating the container on the rotating device, thereby causing the sequence of optical patterns to irradiate the volume of photopolymer from different angles and curing a portion of the volume of photopolymer to form a three-dimensional object (1320).

In response to forming the three-dimensional object in the volume of photopolymer (1322), the computer controls a gantry system to remove the three-dimensional object from the container and to place the three-dimensional object in a post-processing device, such as a wash solvent container or a curing station (1324).

In some embodiments, in response to opening the one or more outlets to drain the uncured photopolymer, the computer fills the container with a wash solvent through the one or more inlets. In some embodiments, while filling the container with the wash solvent, the one or more outlets remain open but are switched to be connected to a wash solvent container (e.g., by controlling a valve). As a result, the three-dimensional model is flooded with wash solvent (e.g., the inlets are located at a top portion of container, and the outlets are located at a bottom portion of the container) for better cleaning results.

In some embodiments, the container includes an impeller. In response to filling the container with the wash solvent, the computer controls the impeller to agitate the wash solvent to wash the three-dimensional object by stirring the wash solvent or jetting the wash solvent directed towards the three-dimensional object.

In some embodiments, the container includes an ultrasonic cleaning device. In response to filling the container with the wash solvent, the computer activates the ultrasonic device to agitate the wash solvent to wash the three-dimensional object by activating the ultrasonic device.

In some embodiments, in response to draining the uncured photopolymer, the computer rotates the container to cause further cleaning of the three-dimensional object by centrifugal force.

In some embodiments, in response to draining the uncured photopolymer, the computer controls to direct air flow into the container.

In some embodiments, the inner surface (e.g., the surface that is in contact with the photopolymer) of the container is coated with polymer-phobic material.

In some embodiments, in response to draining the uncured photopolymer, activating a curing device to cure the three-dimensional object inside the container.

In some embodiments, the curing device is the optics engine, and activating the curing device includes controlling the optics engine to expose the container to light of a second wavelength (e.g., controlling the optics engine to enter a flood lights mode. The second wavelength is different from the first wavelength, and may be determined based on the type of photopolymer in the container).

In some embodiments, the curing device is a heating device (e.g., a heat gun or a heat pad. The heating device may be integrated with or separate from the rotation device) that is configured to heat the container.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus for processing additively fabricated parts, the apparatus comprising:
   an open-topped vessel comprising a drain located on an interior bottom surface of the vessel and having one or more inlets;
   a first storage container;
   a second storage container;
   a first valve coupled to the first storage container and the second storage container and configured to switch between the first storage container and the second storage container;
   a pump coupled to the first storage container and the second storage container, wherein the pump is coupled to the first valve, wherein the pump is located outside of the vessel and the pump is coupled to the one or more inlets of the vessel;
   a second valve coupled to the drain of the vessel, the first storage container and the second storage container, and configured to switch between the first storage container and the second storage container; and
   a controller configured to operate the first valve and second valve into a first configuration and operate the pump to direct a first solvent from the first storage container through the one or more inlets of the vessel and drain the first solvent from the vessel into the first storage container, thereby continuously circulating the first solvent through the vessel and the first storage container.

2. The apparatus of claim 1, wherein the controller is further configured to operate the first valve to switch between the first storage container and the second storage container.

3. The apparatus of claim 1, wherein the controller is further configured to operate the second valve to switch between the first storage container and the second storage container.

4. The apparatus of claim 1, wherein the pump is a self-priming pump.

5. The apparatus of claim 1, wherein the pump is a positive-displacement pump.

6. The apparatus of claim 1, wherein the pump is a centrifugal pump.

7. The apparatus of claim 1, further comprising a filter coupled to and arranged between the drain of the vessel and the second valve.

8. The apparatus of claim 1, further comprising:
   a first secondary pump located inside of the first storage container;
   a second secondary pump located inside of the second storage container; and
   wherein the first secondary pump and the second secondary pump are each coupled to an inlet of the pump.

9. The apparatus of claim 8, further comprising:
   a first check valve coupled to the first secondary pump; and a second check valve coupled to the second secondary pump;

wherein the first check valve is located inside of the first storage container and the second check valve is located inside of the second storage container.

10. The apparatus of claim 1, wherein at least one of the one or more inlets is arranged within the interior bottom surface of the vessel.

11. The apparatus of claim 1, wherein the interior bottom surface of the vessel slopes away from a side of the vessel toward the bottom surface of the vessel.

12. The apparatus of claim 1, further comprising a fan arranged above the vessel, oriented to direct air into the vessel.

13. The apparatus of claim 1, further comprising a first level sensor located in the first storage container configured to sense a level of solvent in the first storage container.

14. The apparatus of claim 1, further comprising a first saturation sensor located in the first storage container configured to sense whether a solvent in the first storage container is saturated with a target solute.

15. The apparatus of claim 1, further comprising a second pump coupled to the first storage container and the second storage container, wherein the second pump is coupled to second valve, wherein the second pump is located outside of the vessel and the second pump is coupled to the drain of the vessel.

16. The apparatus of claim 1, wherein in the first configuration the first valve is open to the first storage container and closed to the second storage container, and wherein the second valve is open to the first storage container and closed to the second storage container.

17. The apparatus of claim 1, wherein the controller is further configured to operate the first valve and second valve into a second configuration and operate the pump to thereby direct a second solvent from the second storage container through the one or more inlets of the vessel and drain the second solvent from the vessel into the second storage container, thereby continuously circulating the second solvent through the vessel and the second storage container.

18. The apparatus of claim 17, wherein in the second configuration the first valve is closed to the first storage container and open to the second storage container, and wherein the second valve is closed to the first storage container and open to the second storage container.

* * * * *